(12) United States Patent
Go Boncan

(10) Patent No.: US 6,626,243 B1
(45) Date of Patent: Sep. 30, 2003

US006626243B1

(54) METHODS AND COMPOSITIONS FOR USE IN CEMENTING IN COLD ENVIRONMENTS

(75) Inventor: Virgilio C. Go Boncan, Spring, TX (US)

(73) Assignee: BJ Services Company, Houston, TX (US)

(*) Notice: Subject to any disclaimer, the term of this patent is extended or adjusted under 35 U.S.C. 154(b) by 0 days.

(21) Appl. No.: 09/644,490

(22) Filed: Aug. 23, 2000

Related U.S. Application Data

(60) Provisional application No. 60/150,474, filed on Aug. 24, 1999.

(51) Int. Cl.[7] .............................................. E21B 33/14
(52) U.S. Cl. ....................................... 166/293; 166/285
(58) Field of Search ................................ 166/285, 292, 166/293, 300, 305.1

(56) References Cited

U.S. PATENT DOCUMENTS

| | | |
|---|---|---|
| 2,846,327 A | 8/1958 | Wood et al. |
| 3,563,313 A | 2/1971 | Spangle .................... 166/292 |
| 3,581,825 A | 6/1971 | Messenger ................ 166/288 |
| 3,887,385 A | 6/1975 | Quist et al. ................... 106/96 |
| 4,102,400 A | 7/1978 | Crinkelmeyer et al. ..... 166/283 |
| 4,132,555 A | 1/1979 | Barrable ....................... 106/90 |
| 4,159,361 A | 6/1979 | Schupack |
| 4,202,413 A | 5/1980 | Messenger ................ 166/292 |
| 4,257,483 A | 3/1981 | Morris et al. .............. 166/292 |
| 4,274,881 A | 6/1981 | Langton et al. ............ 106/98 |
| 4,300,633 A | 11/1981 | Stewart ..................... 166/250 |
| 4,328,036 A | 5/1982 | Nelson et al. ............... 106/85 |
| 4,478,640 A | 10/1984 | Holland ....................... 106/76 |
| 4,482,379 A | 11/1984 | Dibrell et al. ................ 106/76 |
| 4,640,361 A | 2/1987 | Smith et al. ................ 166/288 |
| 4,655,286 A | 4/1987 | Wood |
| 4,902,170 A | 2/1990 | Knox et al. ................. 405/225 |
| 4,957,556 A | 9/1990 | Kunbargi .................... 106/693 |
| 4,967,839 A | 11/1990 | Carpenter et al. |
| 4,968,349 A | 11/1990 | Virtanen ..................... 106/707 |
| 5,028,271 A | 7/1991 | Huddleston et al. ....... 106/720 |
| 5,058,679 A | 10/1991 | Hale et al. .................. 166/293 |
| 5,106,423 A | 4/1992 | Clarke ........................ 106/789 |
| 5,125,455 A | 6/1992 | Harris et al. ............... 166/292 |
| 5,158,613 A | 10/1992 | Sargeant et al. ............ 106/737 |
| 5,159,980 A | 11/1992 | Onan et al. ................. 166/294 |
| 5,183,506 A | 2/1993 | Zhang ........................ 106/739 |
| 5,271,469 A | 12/1993 | Brooks et al. |
| 5,293,938 A | 3/1994 | Onan et al. ................. 166/293 |
| 5,343,950 A | 9/1994 | Hale et al. .................. 166/293 |
| 5,348,093 A | 9/1994 | Wood et al. |
| 5,351,759 A | * 10/1994 | Nahm et al. ............... 166/285 |
| 5,421,409 A | 6/1995 | Mueller et al. ............. 166/292 |
| 5,484,019 A | 1/1996 | Griffith ....................... 166/293 |
| 5,564,503 A | 10/1996 | Longbottom et al. ...... 166/313 |
| 5,569,324 A | 10/1996 | Totten et al. ............... 106/696 |
| 5,571,318 A | 11/1996 | Griffith et al. .............. 106/725 |
| 5,588,488 A | 12/1996 | Vijn et al. .................. 166/293 |
| 5,641,018 A | 6/1997 | King |
| 5,660,625 A | * 8/1997 | Helmboldt et al. ......... 106/736 |
| 5,688,844 A | 11/1997 | Chatterji et al. ............... 524/8 |
| 5,705,237 A | 1/1998 | Andersen et al. |
| 5,711,383 A | 1/1998 | Terry et al. ................... 175/72 |
| 5,711,801 A | 1/1998 | Chatterji et al. ............ 106/789 |
| 5,779,787 A | 7/1998 | Brothers et al. |
| 5,806,594 A | 9/1998 | Stiles et al. |
| 5,851,960 A | 12/1998 | Totten et al. ............... 507/118 |
| 6,145,591 A | 11/2000 | Go Boncan et al. ........ 166/291 |
| 6,230,804 B1 | 5/2001 | Mueller et al. ............. 166/293 |

FOREIGN PATENT DOCUMENTS

| | | |
|---|---|---|
| GB | 0920446 A | 3/1963 |
| GB | 1469954 A | 4/1977 |
| JP | 10216628 A | 2/1997 |
| SU | 891891 | 12/1981 |
| SU | 1636367 A | 3/1991 |
| WO | WO 89/02878 | 4/1989 |
| WO | WO 98/54108 | 12/1998 |
| WO | WO 00/20350 | 4/2000 |
| WO | WO 00/37387 | 6/2000 |

OTHER PUBLICATIONS

Hogg, "Comparison of Multilateral Completion Scenarios and Their Application," SPE 38493, Society of Petroleum Engineers, Inc.; Offshore Europe Conference held in Aberdeen, Scotland, Sep. 9–12, 1997.

Morsy, et al., "Microstructure and Hydration Characteristics of Artificial Pozzolana–Cement Pastes Containing Burnt Kaolinite Clay," Cement and Concrete Research, 27(9), 1307, 1997.

"MetaMax® High Reactivity Metakaolin (HRM) for Improved Pre–cast Concrete," Engelhard Corporation Pigments and Additives Group, C–8–E, Jan. 1997, 7 pages.

Thiercelin, et al. "Cement Design Based on Cement Mechanical Response," SPE 38598, Society of Petroleum Engineers, Inc.; SPE Annual Technical Conference and Exhibition held in San Antonio, Texas, Oct. 5–8, 1997.

Marsh, "An alternative to silica fume?" Concrete Products, EC–6729, Nov. 1994.

"Horizontal Drilling: Multi–Lateral and Twinned Wells," Sperry–Sun Drilling Services, 1993.

Low, et al., "The Flexural Toughness and Ductility of Portland Cement–Based Binders Reinforced With Wollastonite Micro–Fibres," Cement and Concrete Research, 24(2), 250, 1994.

(List continued on next page.)

Primary Examiner—David Bagnell
Assistant Examiner—Jennifer R. Dougherty
(74) Attorney, Agent, or Firm—O'Keefe, Egan & Peterman

(57) ABSTRACT

Cement compositions for cementing wellbores in cold environments. The cement compositions may include a mixture of a reactive aluminum silicate, aluminum sulfate and hydraulic cement, and may include one or more other additives. The cement compositions may be formulated to have reduced heat of hydration as compared to conventional cements, making them suited for cementing in permafrost environments. The cement slurries may optionally be foamed using a foaming agent and energizing phase.

24 Claims, 11 Drawing Sheets

OTHER PUBLICATIONS

Low, et al., "Flexural Strength and Microstructure of Cement Binders Reinforced With Wollastonite Micro–Fibres," 10 pages(undated).

Rieger, et al., "Talc, Pyrophyllite, and Wollastonite", pp 38–40, 42–44 undated).

M–90–339 Silicate Portland Cement Admixture, Engelhard Corporation, Specialty Minerals and Colors (undated).

Ratinov, et al., "Chap. 8—Antifreezing Admixtures" in Concrete Admixtures Handbook, Properties, Science, and Technology, Edited by V. S. Ramachandran, pp. 430–463, 1984.

Ramachandran, V.S., "Concrete Admixtures Handbook Properties, Science, and Technology," Noyes Publications, Library of Congress No. 84–4125 (1984).

Caldarone et al., "High–Reactivity Metakaolin: A New Generation Mineral Admixture," 6 pages (authorized reprint from: Nov. 1994 issue of Concrete International).

Engelhard Corporation "MetaMax® EF High Reactivity Metakaolin (HRM) Pozzolanic Mineral Admixture" 2 pages (1997).

Engelhard "What Makes MetaMax® High Reactivity Metakaolin Stand Out? Let Us Enlighten You" 1 page, (1996).

Kuennen, "Metakaolin might" Concrete Products, 4 pages (May 1996).

Gruber et al., "Exploring The Pozzolanic Activity of High Reactivity Metakaolin," World Cement Research and Development, 6 pages (Feb. 1996).

Improve Cement–Based Products with High Reactivity Metakaolin 2 pages (undated).

Khatib et al., "Sulphate Resistance of Metakaolin Mortar," Cement and Concrete Research, vol. 28, No. 1 pp. 83–92 (1998).

American Petroleum Institute, "Cement Sheath Evaluation" API Technical Report 10TR1 First Edition (Jun. 1996).

Thrush, "A dictionary of mining, mineral, and related terms," compiled and edited by Paul W. Thrush and the Staff of the Bureau of Mines, [Washington] U.S. Department of the Interior, Bureau of Mines, pp. 162, 606 and 696, (1968).

Suman, et al. "World Oil Cementing Hand Book" (1977).

Jutten, et al., Dowell Schlumberger, "Relationship Between Cement Composition, Mechanical Properties and Cement–Bond–Log Output", SPE 16652, pp. 75–82 (Feb. 1989).

Parcevaux, et al., "Cement Shrinkage and Elasticity: A New Approach for A Good Zonal Isolation" SPE 13176, (1984).

Goodwin, Mobil E&P Services Inc. and R.J. Crook, Halliburton Services,"Cement Sheath Stress Failure" SPE 20453 (Dec. 1992).

Carpenter, et al., Arco Oil & Gas Co., "Effects of Temperature and Cement Admixes on Bond Strength" SPE 22063 (May 31, 1991).

Eilers, et al., "High Temperature Cement Compositions: Pectolite, Scawtite, Truscotite or Xonolite, Which Do You Want?" SPE 9286 (Jul. 1983).

Mueller, "An Evaluation of Well Cements for Use in High Stress Environments," Hart's Petroleum Engineer International, pp. 91–93 (Apr. 1998).

International Search Report dated Oct. 30, 2000 (UK counterpart to U. S. patent application Ser. No. 09/644,490.

U.S. patent application Ser. No. 09/662,074 entitled "Compositions and Methods for Cementing Using Elastic Particles" by Brannon, et al. on Sep. 14, 2000 (BJSC:285).

U.S. patent application Ser. No. 10/068,787 entitled "High Temperature Flexible Cementing Compositions and Methods for Using Same" on Feb. 6, 2002 (BJSC:296).

K.R. Backe, "Characterizing Curing–Cement Slurries By Permeability, Tensile Strength and Shrinkage," SPE Drill & Completions 14, Norwegian U. of Science and Technology, Sep. 3, 1999, pp. 162–167.

"Well Cementing," Erik B. Nelson ed., Schlumberger Educational Services, Elsevier Science Publishing Company Inc., 1990, pp. 3–31 to 3–35.

* cited by examiner

METHODS AND COMPOSITIONS FOR USE IN CEMENTING IN COLD ENVIRONMENTS

The present application claims priority on co-pending U.S. provisional patent application Ser. No. 60/150,474 filed on Aug. 24, 1999. The entire text and all contents of the above referenced disclosure is specifically incorporated herein by reference without disclaimer.

FIELD OF THE INVENTION

This invention relates generally to methods and compositions for cementing, and, more specifically to methods and compositions for cementing in cold environments. In particular, this invention relates to methods and compositions for well cementing in permafrost environments utilizing low heat of hydration mixtures of hydraulic cement, aluminum silicate and accelerators.

DESCRIPTION OF RELATED ART

Cementing is a common technique employed during many phases of wellbore operations. For example, cement may be employed to cement or secure various casing strings and/or liners in a well. In other cases, cementing may be used in remedial operations to repair casing and/or to achieve formation isolation. In still other cases, cementing may be employed during well abandonment. Cement operations performed in wellbores having relatively cold temperatures, i.e., bottomhole circulating temperatures typically less than about 50° F., may present particular problems, among other things, in obtaining good wellbore isolation. These problems may be exacerbated in those cases where wellbore and/or formation conditions promote fluid intrusion during or after cement curing, including intrusion of water, gas, or other fluids. Furthermore, relatively cold temperatures may lead to excessive thickening times, resulting in costly delays while waiting on cement to cure ("WOC").

Deepwater well operations typically include operations performed on offshore wells drilled in water depths over about 1,000 feet (especially in Northern latitudes), and more typically, greater than about 2,000 feet deep. Under deepwater conditions, relatively cool temperatures promoted by seawater, in some cases coupled with poorly consolidated formations often make the prevention of fluid intrusion during cementing a challenge. In such cases, relatively cool temperatures (typically less than about 60° F., and more typically, less than about 50° F.) may slow cement curing or hydration, extending the transition time of a cement slurry. Transition time may be defined as the time required for a cement slurry to develop gel strength, or quantitatively as the time for a cement slurry gel strength to go from 100 lb/100 ft$^2$ to 500 lb/100 ft$^2$.

Because longer transition times means that the gel strength of a cement increases relatively slowly, there is more opportunity for intrusion of water or other fluids, such as oil or gas, to migrate through or displace a cement slurry. When such fluid migration occurs, channels, pockets or other cavities may form in the setting cement. Such cavities or channels may create a permanent flow passage or otherwise compromise the integrity of a cement sheath, such as exists between a pipe string and a formation. Furthermore, intrusion of a fluid such as water may dilute a cement slurry and thus prevent it from developing sufficient compressive strength. Fluid migration into a cement is typically more extensive when cement transition times are lengthened because although the cement column in a wellbore has typically built enough gel strength to support itself and to thereby reduce hydrostatic pressure on the surrounding formation, it has not developed sufficient gel strength to prevent fluid intrusion or migration. Although reduced gel strength, extended transition times, and fluid intrusion during cement curing are problems commonly encountered in deepwater completions, such problems may also be encountered in any wellbore having relatively cool formation temperatures, such as in wellbores drilled in cool or cold climates.

In those cases where formation sands are overpressured by fluids such as gas and/or water, fluid intrusion into the setting cement during the cement transition time may be a particular problem. In this regard, shallow formations in deepwater wells typically are unconsolidated, making them weak, prone to fracture, and prone to producing relatively high flows of water. Such a problem may be further exacerbated in those situations in which a relatively lightweight cement slurry is required. Such situations include those in which formations are susceptible to fracture, such as naturally weak or unconsolidated formations, or those with reduced bottom-hole pressures. Lightweight cements typically have longer transition times at relatively cool formation temperatures. Such cements are often referred to as "water extended cement slurries." Due to the relatively long transition times of water extended or lightweight cement slurries, there is increased opportunity for fluid intrusion and cement contamination. Such contamination may result in the loss of formation isolation and/or in casing damage. Resulting cement job failures may result in many undesirable consequences, such as the need for expensive remedial work, increased rig time, loss of production, and/or loss of the wellbore itself.

In cold weather regions, such as the Arctic, the temperature of shallow formations may not exceed 32° F. for several hundred feet of depth. Such formations are typically referred to as "permafrost" which denotes a permanently frozen subsurface formation. Depending on the location, a permafrost or frozen section may extend from a few feet to depths greater than about 1500 feet. In such situations, even where fluid intrusion is not a problem, a cement slurry may not have the opportunity to set and provide needed strength before it freezes. Conventional methods for downhole cementing in permafrost formations have traditionally employed gypsum/Portland cement blends. As compared to conventional Portland cements, these gypsum/Portland cement blends offer reduced BTU output when hydrated, and therefore reduced degree of permafrost melting during and after cement placement. Gypsum/Portland cement blends are also noted for an ability to set under freezing conditions. The density of conventional gypsum/Portland cement blends typically ranges from about 12.0 pound per gallon ("ppg" or "PPG") to about 15 ppg. These cement blends typically contain from about 20% by weight of dry blend ("BWOB") to about 40% BWOB Portland cement, and typically suffer from low compressive strength and high cost.

In some wellbores, gas intrusion may be a particular problem during and after cementing. Such wellbores include, for example, those where a wellbore penetrates a gas formation having a pressure corresponding to a first pressure gradient and a relatively underbalanced permeable zone having a pressure corresponding to a second pressure gradient that is lower than the first pressure gradient. In such cases, hydrostatic pressure exerted by the cement slurry may keep gas intrusion from occurring while the cement is still fluid. However, due to chemical hydration of the slurry and/or dehydration of the slurry across the permeable zone, the pore pressure of the slurry may decrease below the gas pressure in the reservoir allowing the gas to enter the cement. This underbalanced pressure may result, for example, in gas channeling to the surface or to another lower pressure permeable zone.

SUMMARY OF THE INVENTION

Disclosed are cement compositions and methods which, in one embodiment, may be formulated with aluminum silicate and metal sulfate, such as aluminum sulfate, to achieve improved gel and/or compressive strength characteristics in relatively low temperature environments and/or in relatively short periods of time as compared to conventional well cements. Such cement systems may be characterized by the ability to form cement slurries having relatively short transition times, a characteristic which may be particularly advantageous in cold environments and/or in wellbores having relatively weak formations and fracture gradients, both of which are typically found in deepwater offshore wells. Further, the disclosed cement compositions may be formulated to have reduced heat of hydration as compared to conventional cements, making them well suited for cementing in permafrost environments, or in other cold environments such as those where the soil surface temperature does not exceed 32° F. and/or those environments where temperature of shallow formations does not exceed 32° F. for about 100 feet or more. In this regard, thawing of frozen formations may, for example, lead to the creation of a water layer between cement and the formation, which may interfere with the cement-to-formation bond. Advantageously, reduced heats of hydration possible with the disclosed cement compositions may reduce or substantially eliminate thawing of permafrost or other frozen formations, and in doing so facilitate formation of better cement bonds between cement and formation. The disclosed cement compositions may also be formulated to have increased compressive strength and/or shortened pump times as compared to conventional cements, while at the same time exhibiting comparable or decreased heat of hydration as compared to such conventional cements.

As disclosed herein, a cementing system may comprise an ASTM Type I cement, or other suitable hydraulic cement, mixed with reactive aluminum silicate (e.g., such as high reactivity, metakaolin) and/or aluminum sulfate. Optional additives to such a cement system include, but are not limited to, quick-setting gypsum, polyvinyl alcohol-based anti-fluid flow additives, accelerators (including calcium chloride and sodium metasilicate), and/or sufficient water to form a pumpable slurry. Such cement systems may be optionally foamed with, for example, nitrogen to produce stable and lightweight cement slurries. Such a slurry may be formulated to develop, in less than about 35 minutes after placement, sufficient static gel strength to inhibit shallow water flow. In addition, such a slurry may obtain an initial compressive strength (e.g., about 50 psi) in less than about ten hours under seafloor conditions.

In one respect then, disclosed are cementing compositions and methods which offer relatively high compressive strength at relatively low densities and superior stability in freeze-thaw cycling, as compared to conventional gypsum/Portland well cements. The disclosed cementing compositions are particularly useful for downhole cementing in permafrost environments, including those environments where formation temperature of at least one formation is at or below about 32° F. These compositions may be surprisingly formulated with materials as described elsewhere herein, but may also include at least one metal sulfate, such as aluminum and/or ferric sulfate, further increasing performance at low temperatures (e.g., compressive strength, shortened pump times, etc.), while at the same time producing cement compositions that exhibit heat of hydration values comparable or reduced as compared to comparable conventional cement compositions. In various embodiments, these compositions may be formulated to exhibit reduced heat of hydration as compared to conventional gypsum/Portland cementing compositions designed for permafrost environments. By so controlling or reducing BTU output during hydration, quality of cement bonding in, for example, areas of permafrost formations may be advantageously enhanced.

In one embodiment, such a method of cementing within a wellbore located in a permafrost environment includes introducing a cement slurry including a hydraulic cement, aluminum silicate (e.g., metakaolin, high reactivity metakaolin ("HRM"), etc.), and aluminum sulfate. The hydraulic cement (such as API Class G cement) may be present in an amount of from about 50% to about 85%, alternatively from about 68% to about 77% BWOB, although greater and lesser amounts (outside these ranges) are also possible, for example, lesser amounts may be present with the increased concentrations of other dry components. Aluminum silicate may be blended with the hydraulic cement in a concentration of, for example, from about 1% BWOC to about 50% BWOC, and aluminum sulfate may be blended with the hydraulic cement in a concentration of, for example, from about 1% BWOC to about 10% BWOC. Optional accelerators may be employed including, but not limited to, from about 1% to about 20% by weight of mix water ("BWOW") of NaCl, and/or from about 1% BWOC to about 5% BWOC of $CaCl_2$.

In another respect, disclosed is a method of cementing within a wellbore located in a seafloor at a water depth greater than about 1000 feet, including the steps of introducing a cement slurry including a hydraulic cement and aluminum silicate into a wellbore, and allowing the cement slurry to set within the wellbore. The cement slurry may be introduced into an annulus existing between a pipe and the wellbore. The cement slurry may be allowed to set at a temperature of less than about 60° F. Advantageously, the cement slurry substantially prevents o intrusion of fluids into the wellbore prior to and after setting of the cement slurry. The cement slurry may include between about 1% and about 75% of aluminum silicate BWOC. The cement slurry may further include gypsum, and/or a foaming agent and energizing phase. The aluminum silicate may include at least one of kaolin, metakaolin, halloysite, dickite, nacrite, or a mixture thereof. In one embodiment, the aluminum silicate includes metakaolin. Advantageously, the cement slurry may have a transition time of about 35 minutes or less at a temperature of about 50° F.

In another respect, disclosed is a method of cementing within a wellbore, including the steps of introducing a cement slurry including a hydraulic cement and aluminum silicate into a wellbore, and allowing the cement slurry to set within the wellbore at a temperature of less than about 60° F. The cement slurry may be introduced into an annulus existing between a pipe and the wellbore. Advantageously, the cement slurry may substantially prevent intrusion of fluids into the wellbore prior to and after setting of the cement slurry. The cement slurry may include between about 1% and about 75% of aluminum silicate BWOC. The cement slurry may further include gypsum and/or a foaming agent and energizing phase. The aluminum silicate may include at least one of kaolin, metakaolin, halloysite, dickite, nacrite, or a mixture thereof. In one embodiment, the aluminum silicate includes metakaolin. Advantageously the cement slurry may have a transition time of about 35 minutes or less at a temperature of about 500° F.

In another respect, disclosed is a method of cementing within a wellbore located in a seafloor at a water depth greater than about 1000 feet. The method includes the steps of introducing a cement slurry including a hydraulic cement, between about 1% and about 25% metakaolin BWOC, and a foaming agent and energizing phase into an annulus existing between a pipe and the wellbore, and allowing the cement slurry to set within the wellbore. Advantageously, the cement slurry may substantially prevent intrusion of fluids into the wellbore prior to and after setting of the cement slurry. The cement slurry may be allowed to set at a temperature of less than about 60° F. The cement slurry may further include between about 1% and about 15% of gypsum BWOC, and/or may include from about 0.01 GPS to about 0.5 GPS of foaming agent and from about 50 SCF/bbl to about 2000 SCF/bbl of nitrogen energizing phase. Advantageously, the cement slurry may have a transition time of about 40 minutes or less at a temperature of about 50° F.

In another respect, disclosed is a method of cementing within a wellbore in which the wellbore penetrates at least one formation having a pore pressure and is at least partially productive of a fluid. The method includes the steps of introducing a cement slurry including a hydraulic cement and aluminum silicate into a wellbore, and allowing the cement slurry to set within the wellbore. Advantageously, the cement slurry may substantially prevent intrusion of the fluid into the into the wellbore prior to and after setting of the cement slurry. The cement also substantially prevent intrusion of the fluid into the wellbore prior to setting of the cement when the cement pore pressure is less than the formation pore pressure; In some cases, the formation may be productive of a fluid that is gas. The cement slurry may be introduced into an annulus existing between a pipe and the wellbore. The cement slurry may include between about 1% and about 75% of aluminum silicate BWOC, and may optionally further include gypsum. The aluminum silicate may include at least one of kaolin, metakaolin, halloysite, dickite, nacrite, or a mixture thereof. In one embodiment, the aluminum silicate may include metakaolin, and in another embodiment may include high reactivity metakaolin.

In another respect, disclosed is a method of cementing within a wellbore, including the steps of introducing a cement slurry including a hydraulic cement and aluminum silicate into a wellbore, and allowing the cement slurry to set within the wellbore. In this method the aluminum silicate may include at least one of kaolin, metakaolin, halloysite, dickite, nacrite, or a mixture thereof. In one embodiment the aluminum silicate includes metakaolin. The slurry may have a slurry density of between about 11.5 lbm/gal and about 13.5 lbm/gal.

In another respect, disclosed is a well cementing composition including a hydraulic cement and aluminum silicate. In various exemplary embodiments, a composition may include greater or equal to about 25%, alternatively greater than or equal to about 30%, alternatively greater than or equal to about 40%, alternatively greater than or equal to about 50%, and alternatively greater than or equal to about 60% by weight of one cubic foot of hydraulic cement, in addition to aluminum silicate. The hydraulic cement may be any of the hydraulic cements mentioned elsewhere herein. In this composition, the aluminum silicate may include at least one of kaolin, metakaolin, halloysite, dickite, nacrite, or a mixture thereof. In one embodiment, the aluminum silicate includes metakaolin. The aluminum silicate may be present in any amount disclosed elsewhere herein. Furthermore, any of the cementing additives mentioned elsewhere herein may be employed.

In another respect, disclosed is a method of cementing within a wellbore, including introducing a cement slurry including effective amounts of hydraulic cement, aluminum silicate and metal sulfate into a wellbore; and allowing the cement slurry to cure within the wellbore; wherein the hydraulic cement, the aluminum silicate and the metal sulfate are present in the cement slurry in amounts effective to formulate a wellbore cement.

In another respect, disclosed is a method of cementing within a wellbore, including introducing a cement slurry including effective amounts of hydraulic cement, high reactivity metakaolin, and aluminum sulfate into a wellbore; and allowing the cement slurry to cure within the wellbore; wherein the cement slurry is formulated from a cement composition including greater than or equal to about 50% Portland cement by weight of total dry blend prior to addition of water; and wherein the hydraulic cement, the high reactivity metakaolin and the aluminum sulfate are present in the cement slurry in amounts effective to formulate a wellbore cement.

In another respect, disclosed is a well cementing composition including hydraulic cement, high reactivity metakaolin, and aluminum sulfate; wherein the hydraulic cement, the high reactivity metakaolin and the aluminum sulfate are present in the composition in amounts effective to formulate a wellbore cement.

DESCRIPTION OF ILLUSTRATIVE EMBODIMENTS

Figure 1:
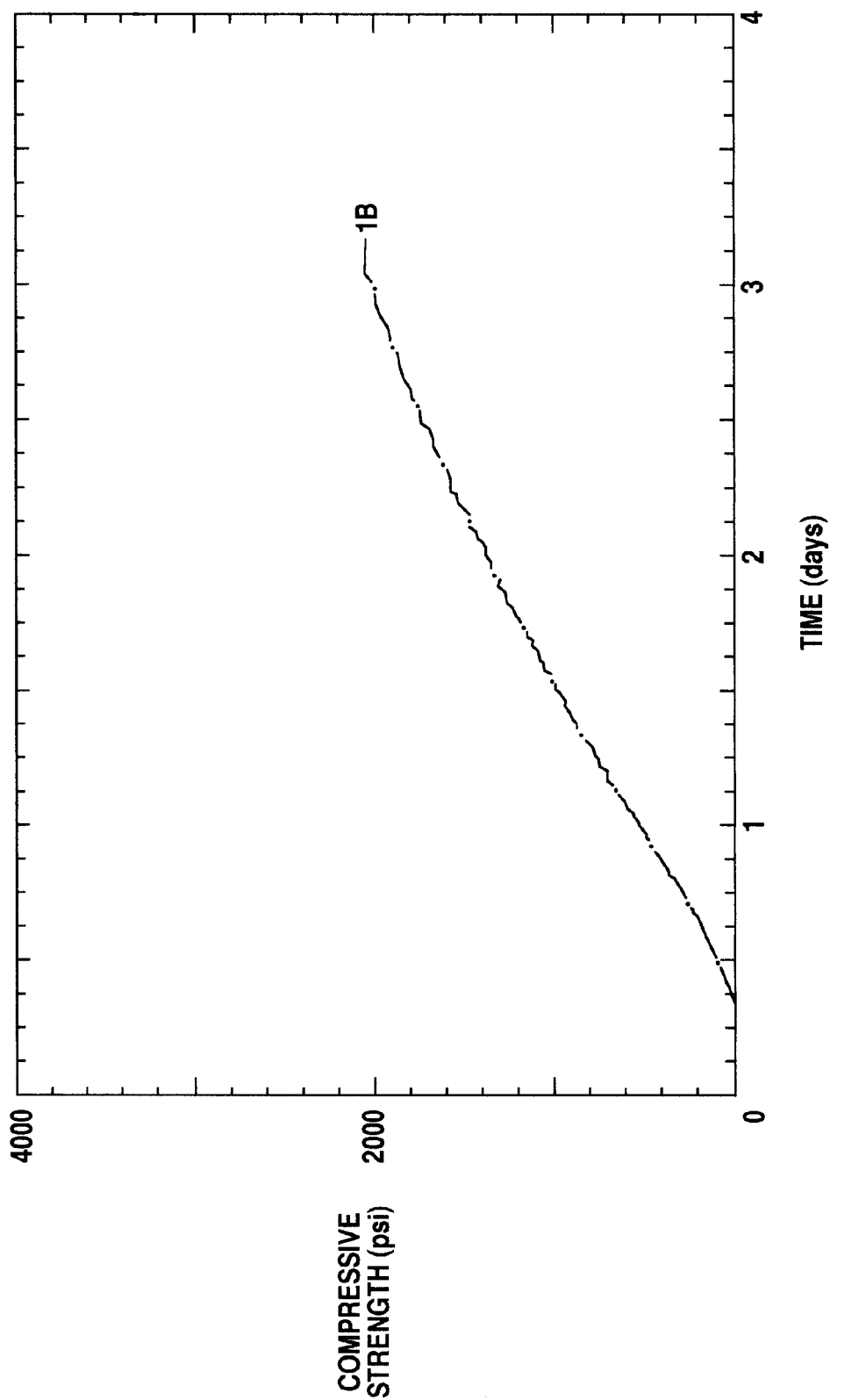
FIG. 1 shows compressive strength versus time for a conventional cement slurry.

The disclosed cement systems containing aluminum silicate and/or metal sulfate such as aluminum sulfate may be useful for, among other things, cementing operations under wellbore conditions prone to fluid intrusion or influx during cement curing. In particular, the disclosed cement systems are useful in cementing operations performed in cold weather environments, deep-water completions, and/or in wellbores in which formations having varying pressure gradients are exposed. In the case of deepwater completions, embodiments of aluminum silicate-containing cement are disclosed which may be utilized to cement, for example, conductor pipe or casing in off-shore well operations located in deepwater, for example, in water that is greater than about 1,000 feet, and in one embodiment in water that is greater than about 2,000 feet.

The disclosed method and compositions may also be advantageously employed in cold weather or arctic environments to provide a cement with a shortened transition time, improved compressive strength prior to freezing, and/or reduced heat of hydration. For example, the disclosed cement systems may be useful in cementing in relatively cold wellbore or downhole environments, including wellbores having bottomhole circulating temperatures of less than about 60° F. In one exemplary embodiment, the disclosed aluminum silicate-containing cement systems may be formulated especially for use in wellbores exposed to formations having a temperature of about 32° F. or less. Such conditions may exist, for example, when cementing surface pipe in open hole or when placing cement within portions of a cased hole that is positioned opposite formations having such temperature. In such relatively cold weather cementing embodiments (e.g., temperatures less than about 60° F., less than about 50° F., and/or less than or equal to about 32° F.), effective amounts of metal sulfate, such as aluminum and/or ferric sulfate, may be added in addition to effective amounts of aluminum silicate to result in a cement composition that exhibits adequate thickening time to mix, pump and displace the cement downhole, and at the same time which exhibits increased compressive strength and reduced heat of hydration, as compared to conventional cementing systems, such as conventional gypsum/Portland cement blends traditionally employed in wellbores under these temperature conditions. In this regard it will be understood that with benefit of this disclosure, effective amounts of aluminum silicate and/or aluminum sulfate may be determined to fit the particular downhole conditions and requirements (e.g., bottomhole circulating temperature, wellbore volume, circulation time required, compressive strength required, etc.) by those of skill in the art using methods known in the art including, but not limited to, methods such as those described elsewhere herein.

In one embodiment, synergistic effects may advantageously be achieved with cement slurries formulated from Portland-based cement compositions containing greater than or equal to about 50% Portland cement by weight of total dry blend prior to the addition of water, alternatively from about 50% to about 85% Portland cement by weight of total dry blend prior to the addition of water, and further alternatively from about 68% to about 77% Portland cement by weight of total dry blend prior to the addition of water. In another embodiment, such cements may further characterized as containing the above-recited ranges of Portland cement, and further containing less than about 4% BWOC $CaCl_2$, (alternatively from about 0% to about 4% BWOC $CaCl_2$, alternatively from about 0% to about 3% BWOC $CaCl_2$, alternatively from about 0% to about 2% BWOC $CaCl_2$, and further alternatively from about 0% to about 1% BWOC $CaCl_2$); and/or such cements may be characterized as containing less than about 20% BWOC gypsum (alternatively from about 0% to about 20% BWOC gypsum, alternatively from about 0% to about 15% BWOC gypsum, alternatively from about 0% to about 10% BWOC gypsum, alternatively from about 0% to about 5% BWOC gypsum, and further alternatively containing substantially no gypsum). The above synergistic effects may be achieved with Portland-based cements using a combination of effective amounts of aluminum silicate and effective amounts of metal sulfate such as aluminum silicate so as to achieve one or more of the effects described herein. I For example, in one embodiment, such a synergistic effect may be particularly realized under relatively cold cementing conditions (e.g., bottomhole circulating temperatures of less than about 60° F., alternatively less than about 50° F.), and especially when these temperature conditions exist in combination with relatively low density cements, such as cements having a density of about 13 ppg or less, alternatively having a density of about 12.5 ppg or less, alternatively having a density of about 12.2 ppg or less, alternatively having a density of from about 8 ppg to about 13, alternatively having a density of from about 8 ppg to about 12.5 ppg, and further alternatively having a density of from about 8 ppg to about 12.2 ppg. An example of the synergistic effects that may be achieved with a combination of effective amount of aluminum silicate such as high reactivity metakaolin with an effective amount of a metal sulfate such as aluminum sulfate under conditions of relatively low temperature and relatively low density is the development of relatively high compressive strengths coupled with relatively low heats of hydration, and superior freeze-thaw resistance. With regard to the latter, the disclosed aluminum silicate/aluminum sulfate cement systems may be formulated to achieve a compressive strength of greater than about 1100 psi (alternatively greater than about 500 psi) after a first freeze-thaw, and greater than 1300 psi (alternatively greater than about 600 psi) after a third freeze-thaw.

In one embodiment, the above-described synergistic effects may be further quantified as follows for slurries formulated with Portland-based cements containing amounts of Portland cement described elsewhere herein and having slurry densities of about 12.2 ppg or greater (alternatively from about 12.2 ppg to about 18 ppg, further alternatively from about 12.2 ppg to about 15 ppg). In this regard, the effects may be so quantified as a compressive strength of greater than about 90 psi as measured at 50° F. at 24 hours, in combination with a heat of hydration of equal to or less than about 6 Cal./Sec-kg (by weight of slurry) as measured at 45° F. immediately after mixing. Furthermore such slurries may additionally or alternatively exhibit a thickening time to 100 Bearden Units of Consistency ("$B_c$") of from about 2.5 hours to about 5.5 hours, alternatively from about 3 hours to about 5 hours, as measured on a high temperature/high pressure ("HTHP") consistometer at bottom hole circulating temperature of a given wellbore. In another embodiment, such synergistic effects may be additionally or alternatively quantified for such slurries of Portland based cements (e.g., having Portland cement content, slurry densities and heats of hydration as described above) as having compressive strength development of greater than about 150 psi at about 42 hours, and alternatively greater than about 90 psi at 24 hours. In one embodiment, such slurries may contain substantially no gypsum (or alternatively, may contain gypsum in amounts described elsewhere herein), and/or may contain $CaCl_2$ in amount described elsewhere herein. It will be understood with benefit of this disclosure that for given wellbore conditions, a lower compressive strength or higher heat of hydration may be acceptable when employing lower density cements.

Furthermore, the disclosed cement systems may be useful in cementing in wellbores susceptible gas influx or migration, such as those wellbores having exposed formations with varying pressure gradients, including such wells having conventional bottom hole temperatures. In addition, the disclosed cement systems may be formulated as high strength, low density cements for use at a variety of downhole temperatures, including conventional temperatures.

Surprisingly, the disclosed aluminum silicate-containing cement systems may be used in, for example, cold and/or deep-water environments, and/or in overpressured and poorly consolidated formations, to provide a cement slurry with improved thixotropic properties over conventional cements. In this regard the disclosed cement systems include compositions which may be used to produce cement slurries that have properties that resist fluid flow from a formation or other source, especially under conditions of cold temperature and/or high pressure differential. In particular, embodiments of the disclosed aluminum silicate-containing systems may be used to formulate cement slurries that offer improved strength development versus time, shortened transition time, and increased compressive strength versus time so as to resist or substantially prevent fluid intrusion, such as influx of gas and/or water, during or after cement curing. In this regard, in one embodiment, aluminum-silicate containing cement compositions disclosed herein exhibit reduced permeability when compared to comparable cement compositions containing no aluminum-silicate. Further advantages include reduction in loss of cement filtrate to permeable formations during cement curing.

Figure 3:
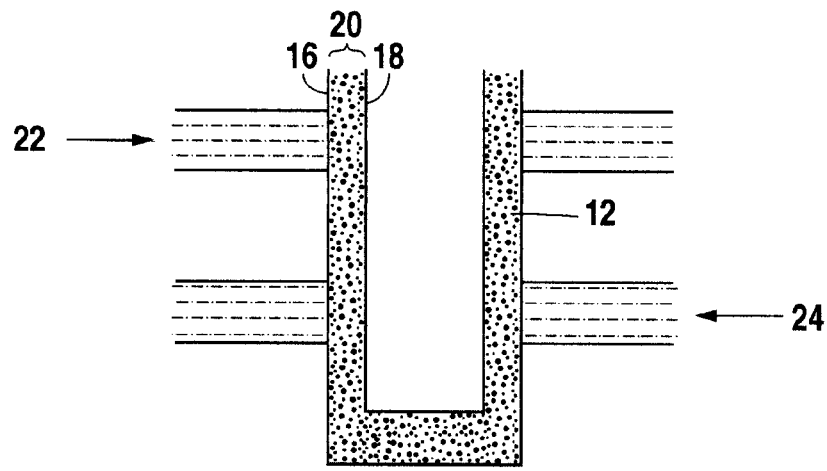
FIG. 3 is a simplified cross-sectional view of a casing string surrounded by cement and suspended in a wellbore having exposed low and high pressure formations.

The disclosed aluminum silicate-containing cement systems also may be used in wellbores susceptible to gas influx, during or after cement curing. In this regard, influx of gas during cement curing may be substantially reduced, resisted or prevented, including gas influx from zones having high pressure relative to the hydrostatic weight of a cement slurry and/or a relative to other zones exposed in a wellbore, as illustrated in FIG. 3. In FIG. 3, a wellbore 16 is illustrated with a casing string 18 suspended therein. A cement slurry 12 is shown disposed in annulus 20 created between casing string 18 and wellbore 16. Gas-containing high pressure zone 22 and low pressure zone 24 are shown exposed in wellbore 16.

In one example, high pressure zone 22 may have a relatively high reservoir or formation pressure, such as about 500 psi, while low pressure zone 24 may have a relatively low reservoir or formation pressure of about 300 psi. Cement slurry 12 may initially have a pressure gradient sufficient to counterbalance both zones 22 and 24, for example to exert about 800 psi at high pressure zone 22 and about 1000 psi at low pressure zone 24. Thus, the hydrostatic pressure exerted by cement slurry 12 is sufficient to keep gas intrusion from occurring while cement slurry 12 is still fluid. However, during chemical hydration of slurry 12 and/or dehydration across a permeable zone (especially a relatively low pressure zone such as zone 24), the cement pore pressure may decrease below the formation pressure of, for example, high pressure zone 22, allowing gas from zone 22 to enter wellbore 16. This would occur, for example, if the pressure exerted by slurry 12 at zone 22 dropped below about 500 psi. Such an unbalanced wellbore pressure at zone 22 and resulting gas entry into wellbore 16 may lead to, for example, gas channeling to the surface, or to another lower pressure permeable zone.

The disclosed aluminum silicate-containing cement slurries offer improved strength development versus time, shortened transition times, and increased compressive strengths versus time. These properties reduce the opportunity for loss in hydrostatic pressure exerted by a cement slurry, and provide increased gel strength for resisting fluid intrusion (such as gas or water influx) into a wellbore from a zone exposed in the wellbore. As used herein, "fluid intrusion" includes partial or complete displacement of cement slurry by a formation fluid, fluid flow between a cement slurry and wellbore tubulars, fluid flow between a cement slurry and surrounding formation face, and/or fluid flow through the matrix of a cement slurry. In addition, reduction in loss of cement filtrate to permeable formations during cement curing helps prevent loss of hydrostatic pressure exerted against potential fluid bearing zones.

Figure 10:
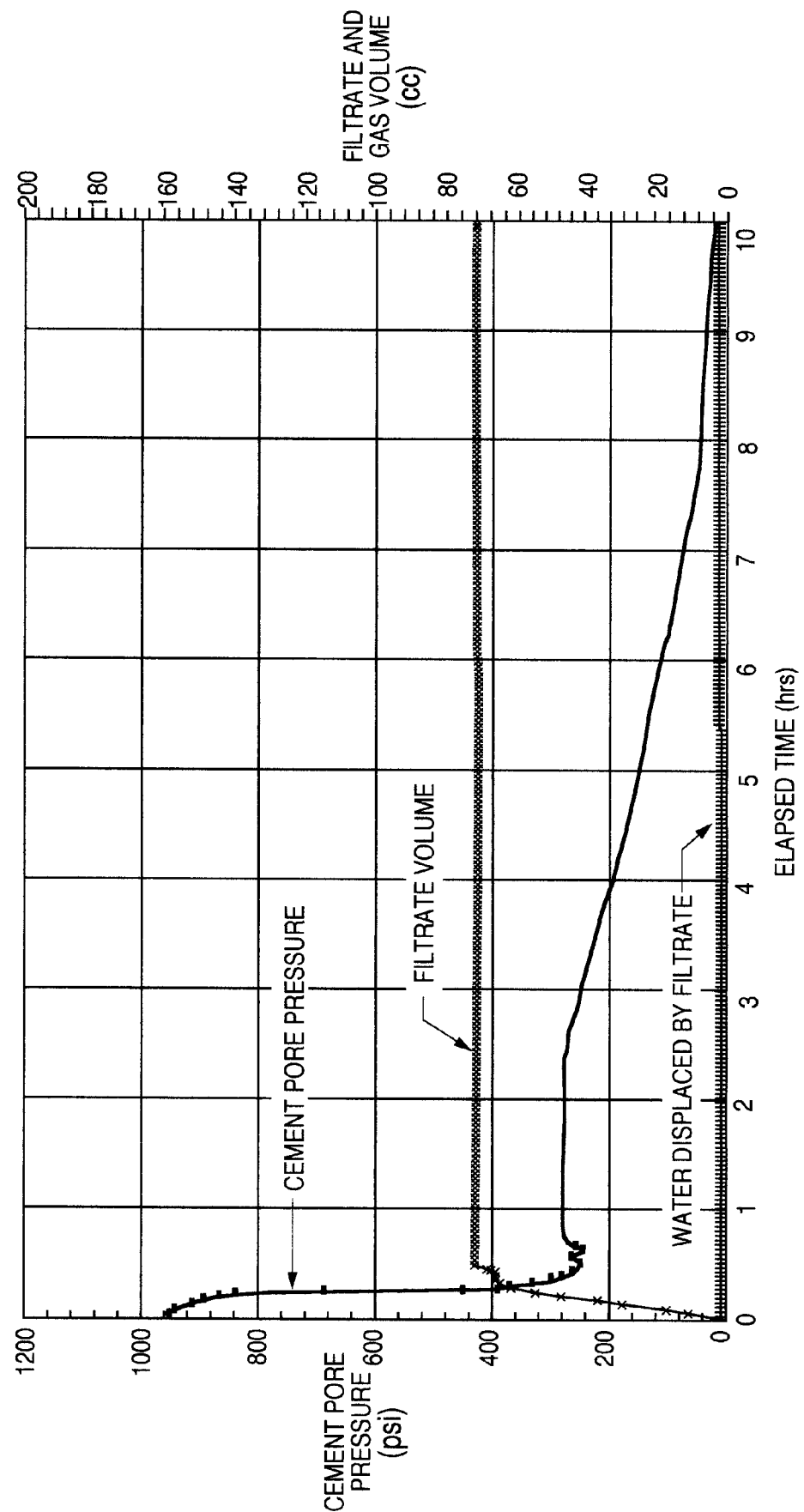
FIG. 10 shows cement pore pressure, water volume displaced by filtrate, and filtrate volume as a function of time for the aluminum silicate-containing cement slurry of Example 8.
Figure 11:
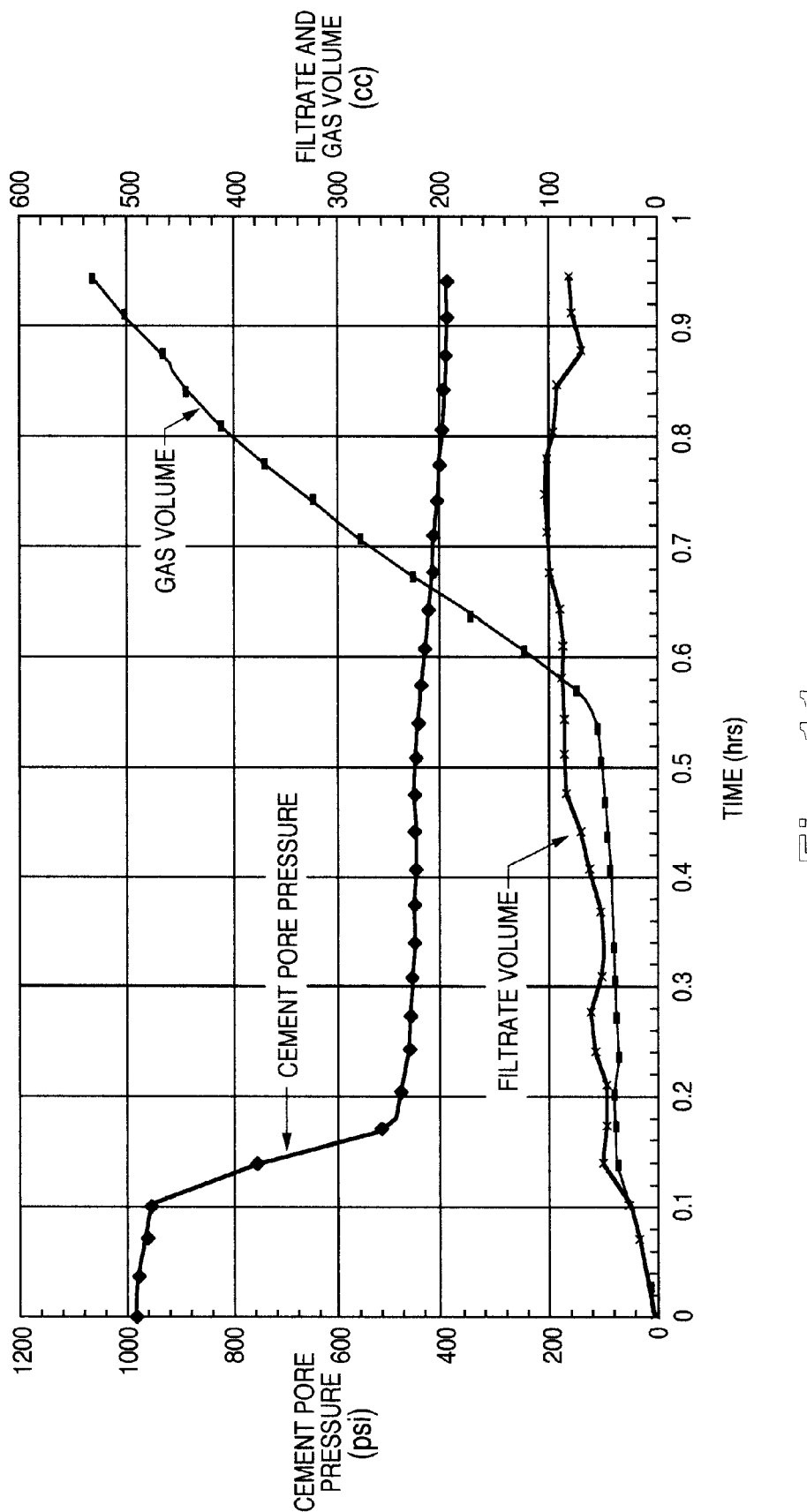
FIG. 11 shows cement pore pressure, gas volume, and filtrate volume as a function of a time for the conventional cement slurry of Comparative Example A.

After curing, gas migration or migration of other fluids into the porous and permeable matrix of the cured cement may be substantially reduced, resisted, or prevented by the disclosed aluminum silicate-containing cement systems. In this regard, the disclosed cured aluminum silicate-containing cement systems may be used to produce cured hydraulic cements having reduced porosity and/or permeability as compared to comparable hydraulic cements lacking aluminum silicate. While not wishing to be bound by theory, it is believed that aluminum silicate compositions tend to react or to promote reactions within a cement slurry matrix that tend to restrict or plug interstitial areas in the cement matrix, and therefore result in reduced porosity and/or permeability of the cement. For example, an otherwise gas permeable Class G cement design may be made substantially less susceptible to gas influx and/or gas tight or substantially gas impermeable by the addition of aluminum silicate as shown in Example 8 (FIG. 10). In contrast, a similar Class G cement design containing no aluminum silicate is more susceptible to gas intrusion as shown in Comparative Example A (FIG. 11).

Comparisons between the aluminum silicate-containing cement systems of the disclosed method and conventional gypsum-containing cements may be found in the examples. As shown in these examples, embodiments of the disclosed aluminum silicate-containing cement containing substantially no gypsum offer surprising advantages over previous gypsum-containing cements, including the formation of cement slurries having shorter transition times and exhibiting a more rapid increase in gel strength and compressive strength as a function of time, thereby minimizing opportunity for water influx during curing. Embodiments of the disclosed aluminum silicate-containing cement may offer considerable cost advantages over previous ultra-fine cement-based deepwater cement systems.

In one embodiment of the disclosed method and compositions, well completion (e.g., primary cementing)

and/or remedial cementing may be successfully performed at relatively low wellbore temperatures such as wellbore bottomhole circulating temperatures less than about 60° F., and alternatively less than about 50° F. At such temperatures, slurries formed from conventional cement compositions typically require unacceptably long transition or setting times and/or fail to achieve zonal isolation in an annulus formed between a pipe string and the walls of a wellbore. Such setting problems at lower temperatures may be exacerbated by formations susceptible to fluid influx, such as water sand formations or shallow gas zones below the sea floor in deepwater completions. In such deepwater completions, temperatures as low as about 30° F. may be encountered within a wellbore at the mud line. Below the mud line, temperatures may vary from about 70° F. to about 40° F., and alternatively from about 60° F. to about 50° F., typically to a depth of about 4000 feet below the mud line.

When employed for cementing in wells have relatively cold downhole temperatures, one embodiment of the disclosed aluminum silicate-containing cement slurries may be formulated to have a transition time of less than about 45 minutes, and alternatively less than about 40 minutes, at a temperature of about 40° F. In another embodiment, an aluminum silicate-containing cement slurry may be formulated to have a transition time of less than about 40 minutes, and alternatively less than about 35 minutes, at a temperature of about 50° F. In another embodiment, an aluminum silicate-containing cement slurry maybe be formulated to have a transition time of less than about 30 minutes, and alternatively less than about 25 minutes, at a temperature of about 60° F. In regard to the above transition time values, foamed embodiments of the disclosed cement slurries may tend to have transition times nearer the greater of the two values given above for each temperature, while unfoamed slurries may tend to have transition times nearer the lesser of the two values. In still another embodiment, an aluminum silicate-containing cement slurry may be formulated to have a transition time of between about 25 and about 45 minutes at temperatures between about 400° F. and about 60° F. Advantageously, these transition times may be much shorter than transition times for conventional cement slurries, which are typically greater than about 45 minutes at a temperature of about 50° F. In another embodiment, an aluminum silicate-containing slurry may have a pump time of about 3 to about 4 hours at about 50° F., and in another embodiment may develop a compressive strength of about 50 psi or more in about 9 hours at a temperature as low as about 50° F.

In embodiments of the disclosed method, aluminum silicate and/or aluminum sulfate may be combined with a suitable hydraulic cement or mixture of hydraulic cements and an aqueous base fluid to form a cementing slurry. This may be done in a batch or continuous cementing process immediately prior to introducing the cement slurry into the wellbore. For example, an aluminum silicate and/or aluminum sulfate-containing cement slurry may be mixed and pumped into a wellbore for the sole purpose of cementing (e.g., primary, remedial, workover or completion cementing), and not used as a fluid for drilling purposes, in whole or in part. In such cases, the cement slurry may be mixed and introduced into the wellbore at one time or in one step, and never circulated back out of the wellbore. When pumped in this manner, the cement slurry may be optionally preceded by a spacer fluid of the type known to those of skill in the art which serves to displace and substantially remove drilling mud present in the wellbore prior to the cementing operation. It is additionally and optionally possible that in such a case no previous deposition of cementious material (e.g., such as materials deposited during drilling operations) may be present on a formation face of the wellbore, and that the cement slurry thus is used to complete the cementing operation in a single step.

In this regard, any hydraulic cement or mixture of hydraulic cements suitable for wellbore cementing and compatible with aluminum silicate may be employed. Typically, hydraulic cement type is selected based on downhole conditions, such as temperature, using methods known in the art. Examples of suitable hydraulic cement types, which may be used alone or in mixtures, include Portland cements, and more particularly ASTM Type I, II, III, IV and/or V Portland cements, and API Class A, B, C, G and/or H Portland cements. In one embodiment one or more types of Portland cements may be used alone or in mixture with other non-Portland type cements. However, it will be understood with benefit of this disclosure that other cements and cements containing other additives may also be suitably employed, including those described elsewhere herein. In this regard, a suitable hydraulic cement type or mixture of hydraulic cement types may be selected based on anticipated cementing conditions with the benefit of this disclosure using methods known in the art. It will also be understood that aluminum silicate may be mixed or otherwise combined with a hydraulic cement, water, and/or other desired additives in any order suitable for forming an aluminum silicate-containing cement slurry. A suitable hydraulic cement may be mixed with various admixtures including, but not limited to, pozzolan, blast furnace sung, hollow microspheres, nitrogen, and mixtures thereof.

When utilized for cementing in a relatively cold environments, such as those described above for cementing conductor pipes in deepwater wells or in Arctic environments, any hydraulic cement suitable for cementing under these conditions may be employed, although a relatively reactive cement such as an ASTM Type I cement or API Class "A" or "C" cement, is often employed. When utilized for cementing in wellbores having relatively conventional temperatures (for example, about 600° F. or greater), such as wellbores susceptible to fluid influx or displacement, or in wellbores susceptible to fluid migration (for example, gas migration) through a gelled cement matrix, such as those previously described, any of the above described hydraulic cements may be employed. It will also be understood with the benefit of the disclosure that any of the hydraulic cements described elsewhere herein may be employed alone or in mixtures in wellbores subject to gas influx or in deepwater or cold environments.

In the practice of one embodiment of the disclosed method an aluminum silicate-containing cement slurry may contain a mixture of aluminum silicate and a suitable hydraulic cement such as described elsewhere herein. Further information on such mixtures may be found in co-pending U.S. patent application Ser. No. 08/995,070 filed on Dec. 19, 1997; and co-pending U.S. patent application Ser. No. 08/989,480 filed on Dec. 12, 1997, both of which are incorporated herein by reference in their entirety. In this regard, any aluminum silicate composition suitable for mixture with a hydraulic cement, and in one embodiment, suitable for decreasing the transition time and increasing gel and compressive strength development of a hydraulic cement slurry during curing, may be employed. In one embodiment, aluminum silicate may be comprised of $SiO_2/Al_2O_3/Fe_2O_3$. In another embodiment, an aluminum silicate may be kaolin or kaolinite, calcined kaolin or kaolinite (metakaolin), or mixtures thereof. Such aluminum silicate may also be referred to as China Clay. Other suitable forms of aluminum silicate include, but are not limited to, halloysite, dickite, and nacrite, and mixtures thereof, as well as mixtures of these with materials with kaolin and/or metakaolin. An aluminum silicate may comprise high reactivity metakaolin in one embodiment.

Further information on suitable aluminum silicates may be found in "*Textbook of Lithology*" by Jackson, K. C., 1970, McGraw-Hill, Library of Congress No. 72–95810, which is incorporated herein by reference. As explained in this reference, in one embodiment kaolins structurally may consist of a sheet of silicon-oxygen tetrahedra coordinated with a sheet of aluminum-oxygen-hydroxide octahedra. The resultant double sheet is typically electrostatically neutral so that no additional ions are required. The various minerals of the group may differ in the stacking patterns of these double sheets. Additional information on high reactivity metakolin may be found, for example, in Gruber et al., "Exploring The Pozzolanic Activity of High Reactivity Metakaolin," World Cement Research and Development (February 1996); Caldarone et al., "High-Reactivity Metakaolin: A New Generation Mineral Admixture," 6 pages (authorized reprint from: November 1994 issue of Concrete International), which are incorporated herein by reference.

In the practice of the disclosed method, the ratio of silica to alumina in the employed aluminum silicate may be between about 65 and about 35, alternatively between about 52 and about 48, although other ratios are possible, including those greater than about 65 and those less than about 35. Aluminum silicates may contain trace amounts of ferric oxide. In this regard, any ferric oxide fraction present maybe present in an amount less than about 1% by weight of aluminum silicate, although fractions greater than about 1% are also possible.

In the practice of the various embodiments of the disclosed method, any amount of aluminum silicate suitable for achieving the benefits of the disclosed cement slurries described herein may be employed. In one embodiment, an aluminum silicate-containing cement for cementing in deepwater and/or cold environments, and/or for cementing in wells susceptible to fluid intrusion, may comprise from about 1% to about 75%, alternatively from about 1% to about 50%, alternatively from about 1% to about 25%, and alternatively from about 4% to about 8% aluminum silicate by weight of base cement ("BWOC"). In another embodiment, such an aluminum silicate-containing cement may comprise greater than 5% aluminum silicate, alternatively from greater than 5% to about 75%, alternatively from greater than 5% to about 50%, alternatively from greater than 5% to about 25%, alternatively from greater than 5% to about 15%, and alternatively from greater than 5% to about 8% aluminum silicate by weight of base cement ("BWOC"). In another embodiment, such an aluminum silicate-containing cement may comprise greater from about 25% to about 35% aluminum silicate by weight of base cement ("BWOC"). It will also be understood with benefit of this disclosure that other embodiments of aluminum silicate-containing cement may comprise greater than about 75% aluminum silicate.

In one embodiment, aluminum silicate may have a particle size of from about 0.4 $\mu$M to about 80 $\mu$M, alternatively from about 0.5 $\mu$M to about 2 $\mu$M, although particle sizes less than about 0.4 $\mu$M and/or greater than about 80 $\mu$M may also be employed. In another embodiment, the aluminum silicate may have a specific gravity of greater than or equal to 2.2, and in another embodiment, about 2.5. In this regard, smaller or more fine particles of aluminum silicate may be useful in situations requiring greater reactivity.

In the formulation and use of the various cement composition embodiments disclosed herein, any type of aluminum silicate suitable for obtaining the desired properties of each embodiment under individual well conditions may be employed. In one embodiment, the disclosed aluminum silicate-containing cement slurries are formed using aluminum silicate in the form of kaolin or calcined anhydrous kaolin (metakaolin), and in one exemplary embodiment in the form of metakaolin. Such metakaolin aluminum silicates include, but are not limited to, those high reactivity metakaolins commercially available as "METAMAX" and, in finer form, as "METAMAX EF", both available from Engelhard Corporation, Specialty Minerals and Colors of Iselin, N.J. "METAMAX" is also available from BJ Services as "MPA-1" and may be characterized as calcined anhydrous Kaolin $Al_2O_3.SiO_2$, and has an average particle size of about 1.5 $\mu$M, is composed of 97% $SiO_2+Al_2O_3+Fe_2O_3$, has a 97% Na minimum with a specific gravity of about 2.5, a maximum wet screen residue of about 0.35% at +325 mesh, a pH of about 4.5–6.5, a maximum free moisture content of about 1.0, a loose bulk density of about 18 lbs/ft$^3$, a tamped bulk density of about 32 lbs/ft$^3$, and a specific gravity of about 2.5. In comparison, "METAMAX EF", available from BJ Services as "MPA-2", has an average particle size of about 0.5 $\mu$M, is composed of 98% $SiO_2+Al_2O_3+Fe_2O_3$, and has a specific gravity of about 2.5, with a similar pH and free moisture content as "METAMAX." It will be understood with benefit of this disclosure that "METAMAX" and "METAMAX EF" are merely given as specific examples of a suitable aluminum silicates, and that other aluminum silicates may be employed as well.

Metakaolins such as "METAMAX" and "METAMAX EF" may be employed interchangeably or in mixtures under a wide variety of well cementing conditions. However, "METAMAX EF" may be optionally selected for use under conditions where greater reactivity is desired, such as under relatively colder conditions (especially cold deepwater and arctic conditions), and "METAMAX" may be optionally selected for use under conditions where reactivity is not as great of a concern, such as under relatively warmer conditions. In this regard, selection of desired aluminum silicate form may be made with the benefit of this disclosure to obtain desired cement and cement slurry properties.

In one embodiment, cement slurries including a metakaolin such as "METAMAX" may be employed for cementing deepwater wells located in areas having a seafloor temperature of greater than or equal to about 40° F., while cement slurries including a metakaolin such as "METAMAX EF" may be used in well cementing applications for cementing deepwater wells located in areas having a seafloor temperature of less than about 40° F. However, it will be understood with benefit of this disclosure that "METAMAX" may be employed for cementing deepwater wells located in areas having a seafloor temperature less than about 40° F., and "METAMAX EF" may be employed for cementing deepwater wells located in areas having a seafloor temperature greater than or equal to about 40° F.

In the formulation and use of the various cement composition embodiments disclosed herein, any type of metal sulfate suitable for obtaining the desired properties of each embodiment under individual well conditions may be employed. Specific examples include, but are not limited to, granular and/or powdered metal sulfates. In this regard, granular metal sulfate may be desired in some cases to provide more control over the properties of a cement composition, although powdered forms are also suitable. In one embodiment, granular aluminum sulfate available as High Grade Aluminum Sulfate from GEO SPECIALTY CHEMICAL COMPANY of Little Rock Arkansas, may be employed.

For cementing in wells having conventional downhole temperatures (e.g., bottomhole circulating temperatures of greater than or equal to about 60° F.), aluminum silicate-containing cement slurries may be formed using metakaolins such as "METAMAX," although any other suitable aluminum silicate as described elsewhere herein, including those such as "METAMAX EF," may be employed. Such embodiments include cementing operations in which it is desirable to control fluid intrusion in wells having conventional downhole temperatures (for example, control of gas and/or water influx and associated displacement of curing cement, or gas invasion into the permeable matrix of a cured cement).

It will be understood with the benefit of the disclosure that any suitable aluminum silicates including, but not limited to, the aluminum silicate compositions mentioned herein, as well as mixtures of any suitable aluminum silicate compositions, may be employed in any given situation. Examples of other suitable aluminum silicates include, but are not limited to, halloysite, dickite, and nacrite.

With benefit of this disclosure, those of skill in the art will understand that any amount of aluminum silicate and/or of hydraulic cement suitable or effective for formulation of a cement composition possessing desired pre and/or post-curing characteristics may be employed. Furthermore, any amount and/or type of metal sulfate, such as aluminum and/or ferric sulfate, suitable or effective for achieving synergistic benefits with other components of a cement slurry (e.g., such as described herein elsewhere) may be employed. Such synergistic benefits include, for example, desired reduction in heat of hydration in combination with relatively high compressive strength and/or other properties. For example, in one embodiment used in permafrost or near-permafrost conditions, (for example, when at least a portion of a cement composition will be exposed to a curing temperature of about 32° F. or less, for example, from about 10° F. to about 32° F., alternatively from about 20° F to about 32° F.), metal sulfate (e.g., aluminum sulfate) may be present in the cement composition in a concentration of from about 1% BWOC to about 10% BWOC, alternatively from about 5% BWOC to about 10% BWOC. In this embodiment, hydraulic cement may be present in an of from about 50% to about 85%, alternatively from about 68% to about 77% BWOB although greater and lesser amounts (outside these ranges) are also possible. With benefit of this disclosure, those of skill in the art will understand that lesser amounts may be present with the increased concentrations of other dry components. In another embodiment, hydraulic cement may comprise between about 30% and about 100% by weight of one cubic foot of hydraulic cement.

It will be understood with benefit of this disclosure that cement compositions containing metal sulfate may also be advantageously employed in cementing applications where temperatures are greater than about 32° F. including, but not limited to, any of the other cementing system embodiments described elsewhere herein. For example, such compositions may be employed in cementing applications where temperatures are less than about 60° F. (such as from greater than 32° F. to about 60° F.), alternatively less than about 50° F. (such as from greater than 32° F. to about 50° F.), and further alternatively less than about 40° F. (such as from greater than 32° F. to about 40° F.).

To further lower the freezing point of a cement composition (such as when permafrost or near permafrost conditions are expected) optional materials may be employed in addition to aluminum sulfate in any amount suitable for achieving desired curing properties. Such optional materials may include, but are not limited to, increased amounts of accelerators mentioned elsewhere herein. These materials may be employed in any amount and/or combination suitable for achieving the desired cement curing properties. For example, in one embodiment NaCl may be optionally present in an amount of greater than about 10% BWOW, alternatively in an amount of from greater than about 10% BWOW to about 37% BWOW, alternatively in an amount of from greater than about 10% BWOW to about 20% BWOW, and alternatively in an amount of from greater than about 10% BWOW to about 15% BWOW. In another embodiment, NaCl may be present in an amount of from about 1% BWOW to about 37% BWOW, alternatively from about 1% BWOW to about 20% BWOW, alternatively from about 1% BWOW to about 15% is BWOW, alternatively from greater than 5% to about 37% BWOW, alternatively from greater than 5% BWOW to about 20% BWOW, alternatively from greater than 5% BWOW to about 15% BWOW. In another embodiment, $CaCl_2$ may be optionally present in an amount of greater than about 1% BWOC and alternatively in an amount of from about 1% BWOC to about 10% BWOC, alternatively from about 1% to about 5% BWOC. It will be understood with benefit of this disclosure that amounts of NaCl and/or $CaCl_2$ outside the above-given ranges may also be employed.

It will be understood with benefit of this disclosure that additives besides those listed above (including, but not limited to, any of the other additives listed herein), may be employed with cement compositions containing aluminum silicate and aluminum sulfate. A few examples of such additives include, but are not limited to, silica flour (available from BJ Services as "S-8") as a filler, lightweight ceramic spheres (available from BJ Services as "LW-6") or nitrogen to reduce cement density, etc. Furthermore, although exemplary concentration ranges have been given herein, it will be understood that any effective concentration range of one or more selected additives may be employed that is suitable for obtaining the benefit thereof. Besides use in cementing systems employed in permafrost or near permafrost conditions, the components described in the preceding paragraph may also be employed in cementing applications where temperatures encountered are greater than about 32° F. including, but not limited to, any of the other cementing system embodiments described elsewhere herein.

In the practice of the disclosed method, an aluminum silicate composition may be mixed with hydraulic cement to form an aluminum silicate-containing cement system or composition. To form an aluminum silicate-containing cement slurry, an aluminum silicate-containing cement system may be mixed with fresh water, but may also be mixed with sea water or any other suitable aqueous-based fluid including but not limited to formation brine, KCl water, NaCl water, sea water, drill water, drilling mud or mixtures thereof. However, it will be understood with benefit of the present disclosure that one or more aluminum silicates may be added at any point in a cement slurry mixing process, including after a hydraulic cement has been mixed with an aqueous based fluid, and/or optionally mixed with an aqueous base fluid prior to mixing with a hydraulic cement.

The water requirement of a cement slurry may be varied to achieve desired density and pumpability. In this regard any amount of water suitable for forming an aluminum silicate-containing cement slurry suitable for placement in a wellbore may be employed. In one embodiment for controlling shallow water influx in a deepwater well, an ultimate cement slurry contains greater than about 40% sea water BWOC, and alternatively, from about 50% to about 60% sea water BWOC, depending on desired pumpability. However, amounts of sea water less than about 40% are also possible. In this embodiment, an aluminum silicate-containing-cement slurry may have a relative density of about 1.82 g/cm$^3$ (15.2 lbm/gal) and may be formulated with a slurry density of about 1.2 g/cm$^3$ (10 lbm/gal) with a fresh/sea water requirement of about 30%–325% BWOC, alternatively 100%–200%. However, it is possible to vary the slurry density, for example, to about 2.2 g/cm$^3$ (19 lbm/gal) with a fresh/sea water requirement of about 22% BWOC. Furthermore, weighting additives such as hematite may be used to increase density to, for example, about 2.2 g/cm$^3$ (19 lbm/gal) using lesser amounts of water.

When used in one embodiment of the disclosed method, a cement slurry density may be formulated to be from about 8 lbm/gal to about 19 lbm/gal, alternatively from about 8 lbm/gal to about 15.0 lbm/gal, alternatively from about 8 lbm/gal to about 14 lbm/gal, alternatively from about 8 lbm/gal to about 13 lbm/gal, alternatively from about 8 lbm/gal to about 12 lbm/gal, alternatively from about 8 lbm/gal to about 11 lbm/gal, and further alternatively from about 8 lbm/gal to about 10 lbm/gal. In another embodiment, a cement slurry density may be formulated to be from about 10 lbm/gal to about 19 lbm/gal, alternatively from about 10 lbm/gal to about 15.0 lbm/gal, alternatively from about 10 lbm/gal to about 14 lbm/gal, alternatively from about 10 lbm/gal to about 13 lbm/gal, alternatively from about 10 lbm/gal to about 12 lbm/gal, and further alternatively from about 10 lbm/gal to about 11 lbm/gal. In yet another embodiment, a cement slurry density may be formulated to be from about 12 lbm/gal to about 19 lbm/gal, alternatively from about 12 lbm/gal to about 15.0 lbm/gal, alternatively from about 12 lbm/gal to about 14 lbm/gal, and further alternatively from about 12 lbm/gal to about 13 lbm/gal. However, any other slurry density suitable for use in a wellbore may be employed including less than about 8 lbm/gal or greater than 19 lbm/gal, if so desired. When necessary to achieve densities of the above embodiments, a system may be foamed with nitrogen gas or other suitable energizing phase to achieve lower densities, for example, to obtain densities as low as about 0.96 g/cm$^3$ (8 lbm/gal). Other low density additives that may be employed to achieve lower densities include, but are not limited to, ceramic spheres, glass bubbles, etc.

In one embodiment, one or more additives suitable for further decreasing transition time may optionally be employed. Examples of such additives include gypsum, calcium chloride, sodium silicate, sodium metasilicate, or mixtures thereof. As a particular example, an aluminum silicate-containing cement may include between about 1% and about 15%, and alternatively, between about 1% and about 10% gypsum BWOC, such as "A-10" gypsum available from BJ Services. However, amounts greater than about 15% gypsum BWOC and less than about 1% gypsum BWOC are also possible.

In embodiments of the disclosed methods and compositions, other additives, including any suitable cementing additives known to those of skill in the art may be employed in the formulation of an aluminum silicate-containing cement slurry. Optional additives may be used, for example, to further vary characteristics of an aluminum silicate-containing cement slurry, including to further vary viscosity, further control fluid loss, further immobilize water between particles, to further impart variable thixotropic properties to a cement slurry, etc. Examples of typical additives include, but are not limited to, accelerators, dispersants, viscosifiers, fluid loss control agents, set retarders, low density additives, weighting agents, thinners, foamers, lost circulation materials, energizing gases (such as nitrogen gas, air, etc.). Thus, an aluminum silicate-containing cement slurry may be formulated for a given situation to provide a reduced transition time while at the same time providing a density compatible with formation pressure gradients in order to avoid cement loss to the formation. For example, embodiments of the disclosed aluminum silicate-containing cement slurries typically may include greater amounts of accelerator additives for use in relatively cold downhole environments, and lesser amounts of such additives for use at relatively higher downhole temperature.

In embodiments of the disclosed method directed toward controlling fluid influx and, in particular, gas influx (including in wells with conventional wellbore bottomhole circulating temperatures of about 60° F. and above) an aluminum silicate-containing cement slurry may comprise a range of aluminum silicate amount in relation to hydraulic cement as previously described herein, and may be varied with benefit of this disclosure depending on the desired slurry density. However, when particular susceptibility to gas intrusion is suspected, the amount of aluminum silicate in an aluminum silicate-containing cement composition may be selected to be from about 8% to about 12% BWOC. As in all embodiments of the disclosed method and compositions, hydraulic cement type may be selected based on downhole conditions, such as temperature, using methods known in the art with benefit of this disclosure.

A slurry embodiment for controlling fluid influx may also include optional cement fluid loss control additives, especially when low pressure or "thief" zones such as illustrated in FIG. 3 are suspected to be present. Examples of fluid loss control additives include, but are not limited to, materials such as hydroxyethyl cellulose ("HEC"), HEC blends, carboxymethyl hydroxyethyl cellulose ("CMHEC"), CMHEC blends, polyethylene imine ("PEI"), copolymers of acrylamide and acrylic acid, polyvinyl alcohol ("PVA"), PVA blends, etc. Such fluid loss control additives may be employed in an amount of from about 0.1% to about 3%, alternatively from about 0.1% to about 2%, and further alternatively in an amount of from about 0.1% to about 1.5% BWOC, although other amounts such as amounts greater than about 3% BWOC are also possible. Other additives as described elsewhere herein may also be optionally employed. In one embodiment, the above described fluid influx control composition may be employed to control fluid influx and, for example gas influx, in wellbores having bottomhole circulating temperatures of greater than or equal to about 60° F., and alternatively between about 70° F. and about 400° F., although benefits of such an embodiment may be realized at temperatures less than about 60° F. or greater than about 400° F. as well.

Any additive/s suitable for controlling fluid flow may also be optionally employed including, but not limited to, polyvinyl alcohol-based anti-fluid flow additives. For example, in one embodiment a polyvinyl alcohol fluid flow additive (such as "BA-10" available from BJ Services) may be used in an amount of between about 0.1% and about 3.0%, alternatively from about 0.1% to about 1.5% BWOC, although other amounts are possible.

Fluid loss control additives may also be optionally used. Such additives include any additive suitable for controlling fluid loss from an aluminum silicate-containing cement slurry prior to setting. Examples of such additives include HEC, CMHEC, 2-acrylomido, 2-methyl propane sulfonic acid, ("AMPS") copolymers, or mixtures thereof. In one embodiment, between about 0.1% and about 3.0%, and alternatively from about 0.1% to about 1.5% of "FL-33" fluid loss control additive BWOC (available from BJ Services) is employed, although other amounts are also possible.

Accelerators may also be optionally employed. In this regard, any accelerator additive/s suitable for well cementing may be used including, but not limited to, calcium chloride potassium chloride, sodium chloride, seawater, sodium silicate, sodium metasilicate, or mixtures thereof. In one embodiment, between about 0.1% and about 4%, alternatively from about 0.1% to about 2% of "A-7" calcium chloride BWOC (available from BJ Services) may be employed in formulating a slurry, although other amounts are possible. In addition to acting as an accelerator, calcium chloride may also serve as a freezing point depressant to lower the freezing point of water within a cement slurry, in some cases preventing freezing of a slurry during mixing and curing. This may be advantageous when cementing operations are performed in very cold environments, further enabling the disclosed aluminum silicate and/or aluminum sulfate-containing cement slurries to develop sufficient compressive strengths without freezing.

Any dispersant additive/s suitable for facilitating the mixing of wet and dry materials in a slurry and/or activating dry materials may also be used including, but not limited to, dispersants such as naphthalene sulfonate, ethoxylated napthalene sulfonate or acetone sulfonate. Such additives may be particularly useful, for example, when lower water to cement ratios are employed. In one embodiment, between about 0.1% and about 3%, alternatively from about 0.1% to about 1.0% of acetone sulfonate, ethoxylated napthalene sulfonate, or naphthalene sulfonate (such as "CD-33," "CD-32" or "CD-31", respectively, available from BJ Services) BWOC is used, although other amounts are possible.

Low density additives may also be optionally employed. In this regard, any additives suitable for lowering slurry density may be used including, but not limited to, sodium silicate, sodium metasilicate, hollow microspheres, or mixtures thereof. In one embodiment, between about 1% and about 75% BWOC, alternatively from about 1% to about 75% BWOC, alternatively from about 1% to about 50% BWOC, of a lightweight additive such as hollow ceramic microspheres available as "LW-6" (available from BJ Services) may be employed in formulating a slurry, although other amounts are possible.

Set retarders may also be optionally used. Any set retarder composition suitable for retarding or otherwise delaying the setting of an aluminum silicate-containing cement, such as for increasing pumping time of a cement slurry, may be used. Examples include, but are not limited to lignosulfonates, sugars, phosphonates, or mixtures thereof. In one embodiment, between about 0.1% and about 3% BWOC, alternatively from about 0.1% to about 1.0% BWOC of a sodium lignosulfonate cement retarder "R-3" (available from BJ Services) may be employed as a set retarder, although other amounts are possible.

By using additives in combination with aluminum silicate and hydraulic cement, aluminum silicate-containing cement slurries may be formulated to possess desired characteristics, such as high early compressive strength, to fit particular applications at specific temperatures or ranges of temperatures, if so desired. In this regard, suitable additives include, but are not limited to, one or more of those additives mentioned elsewhere herein. For example, in one embodiment, an aluminum silicate-containing cement slurry comprises between about 30% and about 100% by weight of one cubic foot of hydraulic cement and from about 1 to about 40% of aluminum silicate BWOC. In this embodiment, the aluminum silicate-containing cement slurry possesses a transition time of between about 30 minutes to about 35 minutes, and a relatively high early compressive strength range of between about 50 psi to about 100 psi in less than about 10 hours, both measured at a temperature of from about 45° F. to about 55° F.

In another embodiment of the disclosed method, aluminum silicate may be used as a pozzolan replacement or extender in the formulation of high strength, low density cements, such as may be used desired when cementing wellbores penetrating low pressure formations and/or formations susceptible to formation damage. In this regard, any amount of aluminum silicate suitable for imparting increased strength to a relatively low density cement may be employed, including those aluminum silicate content ranges described elsewhere herein. However, surprisingly good results are obtained using aluminum silicate-containing cement compositions comprising amounts of aluminum silicate greater than 10% BWOC. For example, from about 15% to about 60%, and alternatively, about 35% of aluminum silicate BWOC may be employed to impart surprisingly improved compressive strengths for low density cements. Amounts of aluminum silicate less than about 10% BWOC and greater than about 60% BWOC may also be employed. Advantageously, this embodiment of the disclosed method provides cement compositions giving higher strengths at any given density over cement compositions employing conventional extenders, such as pozzolan (fly ash) and/or bentonite.

In one embodiment, the disclosed aluminum silicate-containing high strength, low density cements may be formulated to have a slurry density of between about 11.5 lbm/gal and about 13.5 lbm/gal, although densities less than about 11.5 lbm/gal and greater than about 13.5 lbm/gal are also possible. Examples of such cement formulations and their characteristics are given in Example 8 and Tables 5 and 6. In formulating such high strength, low density cements, other extenders may also be present in a cement composition or slurry including, but not limited to, pozzolan (e.g., Class C fly ash, Class F fly ash, etc.) and/or bentonite. Other advantages offered by the disclosed high strength, low density aluminum silicate-containing cements of this embodiment include reduced cost where sufficient viscosity may be obtained with reduced amounts or elimination of bentonite. Furthermore, when used as a pozzolan replacement, aluminum silicate may be added to a cement slurry after mixing, eliminating the need for extender pre-blending prior to adding water as typically required, for example, when pozzolan extenders are employed. This capability may be particularly advantageous, for example, for cementing operations performed in remote locations where blending facilities are not available or easily accessible. It will be understood with benefit of this disclosure that any of the aluminum silicate materials, cements and optional additives described elsewhere herein may be employed to mix or formulate high strength, low density cement slurries for cementing wellbores using any suitable operational methods known in the art, including cementing at conventional and non-conventional temperatures, and in remedial or workover situations.

It will be understood with the benefit of this disclosure that a cement slurry may also contain other conventional additives including but not limited to additives for controlling free water or solid separation, silica fume, glass or ceramic microspheres, perlite, etc.

When so desired, a cement slurry may be foamed utilizing a foaming agent, optional stabilizer, and an energizing phase. In this regard, any foaming agent and/or stabilizer suitable for creating a stable foamed aluminum silicate-containing cement may be employed in any amount suitable for obtaining a foamed cement slurry. In the case of salt water based cement slurries, examples of suitable foaming agents include, but are not limited to, oxyalkylated sulfates or ethoxylated alcohol sulfates, or mixtures thereof. In one embodiment "FAW-20" ethoxylated alcohol sulfate foaming agent available from BJ Services is utilized. Suitable salt water stabilizers include, but are not limited to, polyvinyl alcohol, sodium silicate, or mixtures thereof. In one embodiment, a polyvinyl alcohol stabilizer known as "BA-10" and available from BJ Services is used. In the case of fresh water based cement slurries, examples of suitable foaming agents include, but are not limited to, oxyalkylated sulfates or ethoxylated alcohol sulfates, or mixtures thereof. In one embodiment "FAW-20" foaming agent available from BJ Services is utilized. Suitable fresh water stabilizers include, but are not limited to, polyvinyl alcohol or sodium silicate, or mixtures thereof. In one embodiment, "BA-10" stabilizer available from BJ Services is used.

Any energizing phase composition suitable for forming a foamed aluminum silicate-containing cement may be employed including but not limited to gaseous material such as carbon dioxide, nitrogen, compressed air, liquid petroleum gases (such as liquefied natural gas and liquefied petroleum gas, etc.), or a mixture thereof. An energizing phase may be added to a mixture of cement, aqueous fluid, surfactant and stabilizer. The slurry density may be controlled with benefit of this disclosure by adjusting the amount of energizing phase added to an unfoamed cement slurry. For example, in one embodiment the density of an aluminum silicate-containing cement slurry may be adjusted from about 8 to about 15 lbs/gal by adding from about 1500 to about 25 standard cubic feet (SCF) of nitrogen gas at standard conditions per barrel (bbl) of unfoamed cement slurry, although any other amounts suitable for obtaining a foamed cement slurry are possible.

One or more defoaming additives may also be optionally used with aluminum silicate-containing foamed cement slurries to prevent foaming during mixing and pumping of a foamed slurry. In this regard, any defoaming additive suitable for cementing operations may be employed including, but not limited to, glycol, alcohols or silicones, or mixtures thereof. In one embodiment "FP-12L" defoaming additive available from BJ Services is employed in an amount of from about 0.01 to about 0.5 gallons per sack ("GPS") concentration, and alternatively from about 0.05 to about 0.1 GPS concentration, although other amounts are possible.

In either salt water or fresh water based cement slurries, any suitable energizing phase, including but not limited to nitrogen, $CO_2$, air or mixtures thereof may be employed in a sufficient amount to achieve the desired density of cement, for example, in an amount of between about 10 SCF/bbl and about 2000 SCF/bbl at standard conditions, and alternatively between about 100 SCF/bbl to about 1000 SCF/bbl, although other amounts are possible. In one embodiment nitrogen is employed.

In one foamed salt water based cement embodiment, nitrogen may be employed with a cement composition comprising between about 40 and about 100% of ASTM Type 1 cement and from about 4 to about 6 of "METAMAX" aluminum silicate, in combination with "CD-33" acetone formaldehyde condensates, "BA-10" polyvinyl alcohol, "A-7" calcium chloride, and "A-2" sodium metasilicate (with "CD-33," "BA-10," "A-7," and "A-2" being available Services). In this embodiment from about 0.01 GPS to about 0.5 GPS, and alternatively from about 0.05 GPS to about 0.16 GPS of "FAW-20" foaming agent is employed with nitrogen in an amount of between about 50 SCF/bbl and about 2000 SCF/bbl, and alternatively between about 100 SCF/bbl to about 1000 SCF/bbl, so as to achieve a foamed cement slurry having a density of between about 8 and about 15 lbm/gal, and alternatively between about 9 and about 13 lbm/gal, although other nitrogen amounts and densities are possible. A polyvinyl alcohol stabilizer may also be employed in an amount of from about 0.1 to about 1.5, and alternatively from about 0.2 to about 0.8.

In one fresh water based foamed cement embodiment, the same types and amounts of nitrogen energizing phase, cement, aluminum silicate, and other additives described for a salt water based cement slurry are employed with a ethoxylated alcohol sulfate foaming agent and a polyvinyl alcohol stabilizer. In this fresh water embodiment, the ethoxylated alcohol sulfate foaming agent may be present in an amount of from about 0.01 GPS to about 0.5 GPS, and alternatively, from about 0.05 GPS to about 0.10 GPS, and the polyvinyl alcohol stabilizer present in an amount of from about 0.1 to about 1.5, and alternatively, from about 0.2 to about 0.8, so as to achieve a foamed cement slurry having a density of between about 8 and about 15 lbm/gal, and alternatively, between about 9 and about 13 lbm/gal, although other nitrogen amounts and densities are possible.

When a foam cement slurry is employed to cement a conductor pipe in a deepwater completion, the density of the foam cement slurry may be maintained so that the fracturing gradient of the near-surface formation surrounding the conductor pipe is not exceeded. In this regard, the slurry density may be adjusted to be slightly above the formation pressure but below the fracturing pressure so as to prevent fluid influx during the cement transition time while at the same time maintaining control over the slurry. In this regard, a density of a foam cement slurry may be adjusted to be from about 1 to about 3 lbm/gal above a density needed to equalize the formation pressure, although other densities may be used as desired.

Embodiments of the disclosed method and compositions offer, among other things, cement slurries having the characteristic of developing sufficient gel strength to resist or prevent influx of formation fluids during the transition time when the slurry is static after placement in a wellbore. In this regard, the non-foamed embodiment of the disclosed aluminum silicate-containing cement slurry described above develops a gel strength or yield point of greater than about 500 lbf/100 ft$^2$ within about 30 minutes of time of placement, thus reducing or substantially preventing fluid migration into a cement sheath from formations surrounding the wellbore. Other characteristics of the unfoamed cement embodiment includes pump times at 50° F. of about 4–5 hours, transition times of about 35 minutes or less, API fluid loss of less than about 30 cubic centimeters (cc) fluid loss in 30 minutes, good compressive strength development at relatively short periods of time at temperatures of less than about 50° F., and little or no free water development.

Likewise, the foamed cement slurry embodiments described above develop a gel strength or yield point of greater than about 500 lbf/100 ft$^2$ within about 35 minutes of time of placement, similarly reducing or substantially preventing fluid influx into the cement from the formation surrounding the wellbore. Other characteristics of the foamed cement embodiment includes relatively low densities, pump times at 50° F. of about 4 to about 5 hours, transition times of about 35 minutes or less, API fluid loss of less than about 30 cc fluid loss in 30 minutes, good compressive strength development at relatively short periods of time at temperatures of less than about 50° F., and little or no free water development.

To further illustrate these and other advantages of the disclosed aluminum silicate-containing cement systems, Examples 1 and 2 are provided comparing both foamed and unfoamed embodiments of slurries formed using the disclosed aluminum silicate-containing cement systems with conventional foamed and unfoamed cement slurries, respectively. As indicated by the results of these examples, embodiments of the disclosed cementing system may be well suited for, amount other things, use as shallow water flow inhibiting "tail" slurries, as well as for use base cements which may be nitrified to produce lightweight "filler" slurries.

In one embodiment, a foamed or unfoamed cement slurry of hydraulic cement and aluminum silicate as described herein is utilized to cement a conductor pipe in a deepwater well completion. In such a completion, a conductor pipe may be positioned or placed in a wellbore drilled through a surface pipe which has been set through the mud line. In such situations an annulus is typically formed between the outside diameter of the conductor pipe and the interior diameter of the wellbore in which cement may be placed to isolate the formations exposed at the wellbore face. In this embodiment, a foamed or unfoamed aluminum silicate and/or aluminum sulfate-containing cement slurry may be introduced by displacing the slurry down the interior of the conductor pipe and circulating the slurry around the end of the conductor pipe and into the wellbore conductor pipe annulus. Sufficient cement slurry may be pumped through the conductor pipe and around and into the annulus so as to obtain cement returns at the sea floor. As described elsewhere herein, in one embodiment such a cement slurry may be formulated and introduced into a wellbore only as a cementing material and never used or circulated back out of the well for any other purposes, such as for use a drilling fluid. In any case, the cement slurry may be preceding by a spacer fluid of the type known to those of skill in the art which serves to displace and substantially remove drilling mud present in the wellbore prior to cementing. Once the aluminum silicate-containing cement slurry has been circulated around the bottom end of the conductor pipe, typically through the annulus to the sea floor, the cement slurry may be maintained within the annulus and allowed sufficient time to gain gel and compressive strength. By utilizing such an aluminum silicate-containing cement slurry, influx of fluids from the surrounding formation during curing may be substantially prevented or reduced over conventional cement slurries or compositions employed for this purpose.

In one embodiment for cementing casing in a wellbore (such as cementing a conductor pipe in a deepwater well completion), a relatively lower density aluminum silicate-containing cement "lead" slurry is initially pumped down the interior of the pipe and followed by a relatively higher density aluminum silicate-containing "tail" slurry. In such a cementing application, a sufficient volume of tail slurry may be pumped so that it may be displaced around the shoe at the end of the job, and so that it may set up in the shoe joint. In such an embodiment the volume of the lead slurry may comprise between about 60% and about 80% of the total slurry pumped, with the tail slurry comprising the remaining volume, although the lead slurry may represent a greater or lesser percentage of the total slurry pumped. In another embodiment, the lead slurry represents about 70% of the total slurry volume pumped, with the tail slurry representing the rest. In one embodiment, the lead slurry may be an aluminum silicate-containing nitrified cement slurry (as described elsewhere herein) having a density of from about 9 lbm/gal to about 13 lbm/gal, with the tail slurry being a non-nitrified aluminum silicate-containing cement slurry having a density of from about 15 to about 16.2 lbm/gal, although other combinations of slurry densities are possible. In a one embodiment the lead slurry is formulated with nitrogen and foaming agent as it is pumped, with the nitrogen and foaming agent being no discontinued after a desired amount of lead slurry has been pumped, the remaining slurry being pumped as the non-foamed tail slurry.

Although suitably employed to cement pipe strings at relatively shallow depths in relatively cold temperature wellbore environments, such as deepwater completions and in permafrost or near permafrost conditions, it will be understood with benefit of this disclosure that benefits of the disclosed compositions and methods may be obtained in any wellbore environment having relatively cold temperatures as described herein. For example, the disclosed foamed and unfoamed aluminum silicate-containing cement slurries and aluminum silicate/aluminum sulfate-containing cement slurries may be employed in any cementing operations performed under relatively cold downhole conditions (such as may be encountered, for example, in arctic or other similarly cold environments), to reduce or substantially prevent fluid influx during curing, to decrease heat of hydration, and/or to allow a slurry to cure to a sufficient compressive strength, for example, prior to freezing. In this regard, it will also be understood that "cementing operations" as used herein means any type of wellbore cementing application known in the art, including long string cementing, liner cementing, inflatable packer cementing, squeeze cementing, etc. Such operations include, but are not limited to, drilling, completion and remedial cementing operations, including those performed on existing completed wellbores, as well as those cementing operations performed during well abandonment operations.

Furthermore, it will be understood with benefit of this disclosure that although exemplary ranges and amounts of hydraulic cement, aluminum silicate, aluminum sulfate and/or other additives are described and illustrated herein, any other amounts and combinations of these components and/or other additives may be suitably employed where the benefits of the disclosed aluminum silicate-containing cement systems and aluminum silicate/aluminum sulfate-containing cement systems may be realized as described elsewhere herein. It will also be understood that although specific embodiments of cementing procedures using aluminum silicate-containing cement slurries and aluminum silicate/aluminum sulfate containing cement slurries have been described herein, such slurries may be mixed, pumped, spotted, or otherwise introduced into a wellbore and/or wellbore annulus in any manner known to those of skill in the art. Furthermore, such slurries may be formulated with benefit of this disclosure in any suitable manner known to those of skill in the art including, but not limited to, by continuous mixing, batch mixing, etc.

Using components described herein, a cement composition may be formulated in one embodiment with effective amounts of aluminum silicate and metal sulfate (such as aluminum sulfate) so as to have a heat of hydration (by weight of slurry) immediately after mixing of equal to or less than about 6 calories/second-kilogram (cal/sec-kg.) at 45°, alternatively equal to or less than about 5 calories/second-kilogram (cal/sec-kg.) at 45°, alternatively equal to or less than about 4 calories/second-kilogram (cal/sec-kg.) at 45°, alternatively equal to or less than about 3 calories/second-kilogram (cal/sec-kg.) at 45°, and further alternatively equal to or less than about 2 calories/second-kilogram (cal/sec-kg.) at 45. In another embodiment, a cement composition may be formulated with effective amounts of aluminum silicate and metal sulfate (such as aluminum sulfate) so as to have a heat of hydration (by weight of slurry) immediately after mixing of from about 1 to about 2 calories/second-kilogram (cal/sec-kg.) at 45° F., alternatively of from about 1 to about 3 calories/second-kilogram (cal/sec-kg.) at 45° F., alternatively of from about 1 to about 4 calories/second-kilogram (cal/sec-kg.) at 45° F., alternatively of from about 1 to about 5 calories/second-kilogram (cal/sec-kg.) at 45° F., and further alternatively of from about 1 to about 6 calories/second-kilogram (cal/sec-kg.) at 45° F. Such an aluminum silicate/metal sulfate composition may additionally or alternatively exhibit a heat of hydration (by weight of slurry) at the point where a cement composition starts to change from liquid to solid of less than or equal to about 6 calories/second-kilogram (cal/sec-kg.) at 45° F., alternatively from about 1 to about 6 calories/second-kilogram (cal/sec-kg.) at 45° F.

In another embodiment, a cement composition may be formulated with effective amounts of aluminum silicate so as to have a heat of hydration (by weight of slurry) immediately after mixing of from about 1 to about 3 calories/second-kilogram (cal/sec-kg.) at 45° F., alternatively from about 1 to about 2 calories/second-kilogram (cal/sec-kg.) at 450 ° F., and further alternatively from about 2 to about 3 calories/second-kilogram (cal/sec-kg.) at 45° F. Such a composition may be formulated to have a heat of hydration (by weight of slurry) at the point where a cement composition starts to change from liquid to solid of less than or equal to about 1 calories/second-kilogram (cal/sec-kg.) at 45° F., alternatively from about 0.5 to about 1 calories/second-kilogram (cal/sec-kg.) at 45° F.

EXAMPLES

The following examples are illustrative and should not be construed as limiting the scope of the invention or claims thereof.

The following examples were performed using modified API cement testing equipment. The testing equipment was modified used refrigeration units capable of simulating cold temperatures, such as those found at the seafloor of deep-water offshore wells. Using this equipment, parameters such as thickening time, UCA compressive strength, fluid loss, free water, rheology, and static gel strength transition time were measured under seafloor conditions. API procedures that were followed were according to API Recommended Practice 10B, 22$^{nd}$ Edition, December 1997.

Example 1

In the following example, one embodiment of an aluminum silicate-containing cement slurry was tested and compared to a conventional gypsum-containing cementing system. Characteristics of the conventional gypsum slurry (Slurry #1) and a slurry embodiment employing aluminum silicate (Slurry #2) are presented in Tables 1 and 2. Components of the a slurry systems are listed in Table 1. Slurry properties, testing conditions, and compressive strength information is presented in Table 2.

TABLE 1

Slurry Component Data
(All Percentages given are BWOC)

| SLURRY #1 | SLURRY #2 |
|---|---|
| Holnam Type 1 Cement | Holnam Type 1 Cement |
| 5% "A-10" gypsum | 5% "METAMAX" aluminum silicate |
| 0.8% "CD-32" ethoxylated naphthalene sulfonate dispersant | 0.6% "CD-33" acetone formaldehyde dispersant |
| 0.4% "BA-10" polyvinyl alcohol | 0.4% "BA-10" polyvinyl alcohol |
|  | 0.5% "A-7" calcium chloride accelerator |
|  | 0.2% "A-2" sodium metasilicate |

TABLE 2

Slurry Properties and Test Results

| Slurry Properties | Slurry #1 | Slurry #2 |
|---|---|---|
| Density, ppg | 15.2 | 15.2 |
| Yield, cu.ft./sk. | 1.34 | 1.34 |
| Mixing water, gal/sk. | 6.08 | 6.06 |
| Water type: | SEA | SEA |
| Thickening Time @ 50° F. (hrs.) | 3 hrs, 3 min. | 3 hrs, 39 min. |
| Free Water @ 50° F. (mls.) | Trace | Trace |
| Fluid Loss @ 50° F. (ml/30 min) | 22 | 20 |
| Compressive Strength @ 50° F. (psi) |  |  |
| Time to 50 psi. | 9 hrs, 55 min. | 8 hrs, 51 min. |
| Time to 500 psi | 23 hrs, 47 min. | 21 hrs, 47 min. |
| Compressive Strength at 72 hrs., psi (measured @ 3000 psi curing pressure) | 2000 | 2150 |
| Slurry Rheologies (Fann Readings) |  |  |
| 300 RPM | 126 | 100 |
| 200 RPM | 102 | 82 |
| 100 RPM | 76 | 64 |
| 6 RPM | 50 | 49 |
| 3 RPM | 40 | 38 |
| 600 RPM | 192 | 154 |
| Plastic viscosity ("PV") | 66 | 54 |
| Yield Point ("YP") | 60 | 46 |
| *Transition Time | 38 min. | 32 min. |

*Transition time of cement from 100#/100 ft$^2$ gel strength to 500#/100 ft$^2$ gel strength as determined by a "MACS" analyzer, available from Halliburton.

Figure 2:
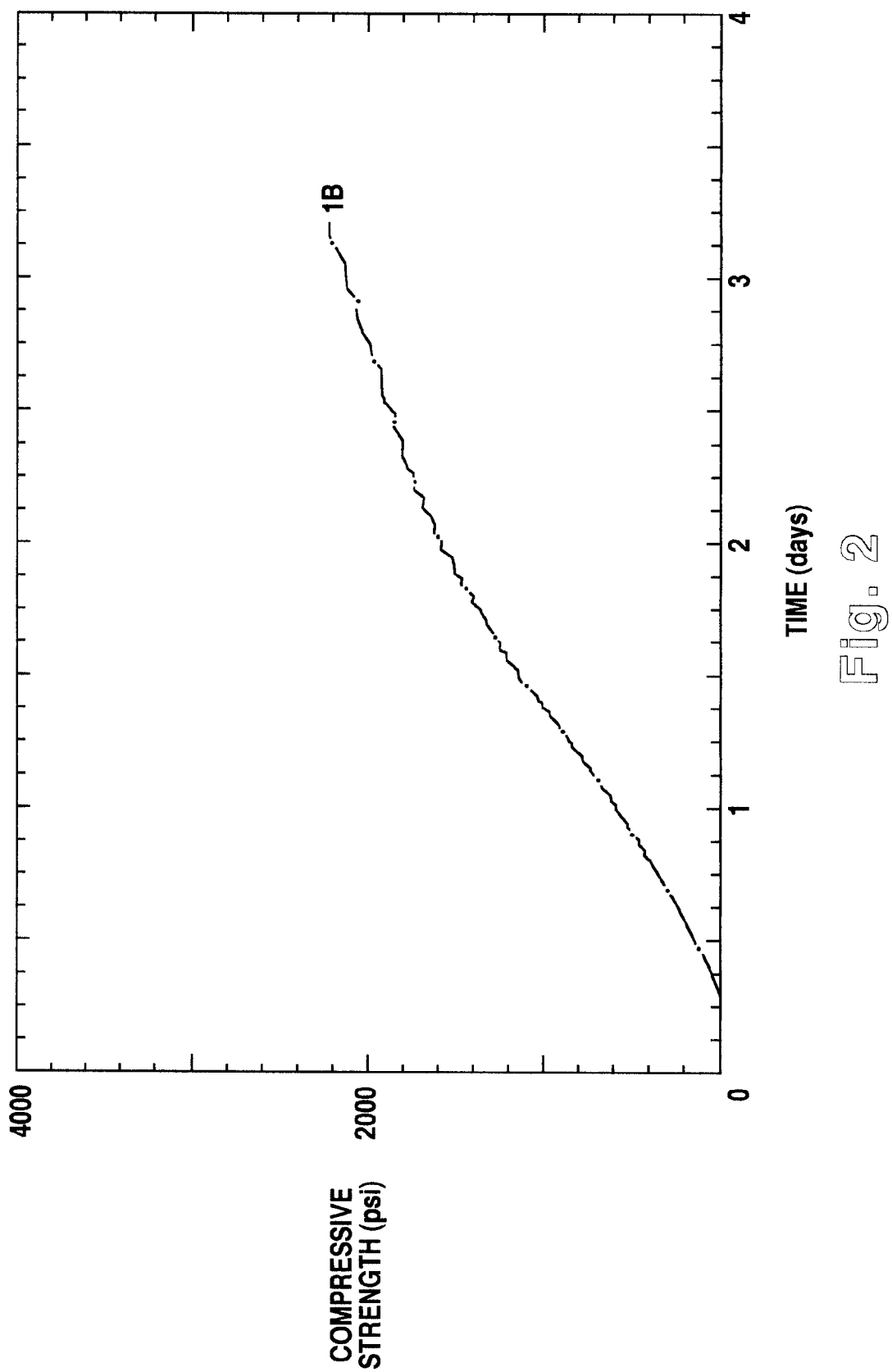
FIG. 2 shows compressive strength versus time for a cement slurry according to one embodiment of the disclosed compositions and methods.

FIG. 1 and FIG. 2 show the development of compressive strength over time (during curing) for Slurry #1 and Slurry #2, respectively. Compressive strength was measured at 3000 psi and 50° F. using an ultrasonic cement analyzer. As can be seen in Table 2, Slurry #2 which includes aluminum silicate according to one of the disclosed embodiments, and methods shows faster development of compressive strength over conventional Slurry #1 which includes gypsum. For example, Slurry #2 develops a compressive strength of approximately 1200 psi after 1.6 days as compared to approximately 1000 psi for Slurry #1, which requires approximately 1.9 days to develop a 1200 psi compressive strength. This represents an increase of about 20% in compressive strength at 1.6 days for the aluminum silicate-containing Slurry #2.

The above test results show that the disclosed aluminum silicate-containing cement compositions (Slurry #2) gives enhanced early compressive strength development compared to gypsum-containing cements (Slurry #1), while at the same time possessing a longer thickening is time. Longer thickening times offer increased pumping time which may be advantageous, for example, when performing relatively large cement jobs such as cementing large shallow casing strings (e.g., 20 inch diameter or larger). Slurry #2 also exhibits a shorter transition time, as well as a shorter time to 50 psi and 500 psi compressive strengths, than does Slurry #1. Furthermore, as can be seen in Table 2 aluminum silicate-containing cement Slurry #2 has lower slurry rheologies than the gypsum-containing Slurry #1, making it easier to mix than conventional slurries.

Example 2

In Example 2, a conventional foamed cement slurry (Slurry #1) was compared to one embodiment of a foamed aluminum silicate-containing cement slurry (Slurry #2). Components of Slurry #1 and Slurry #2 are given in Table 3, and slurry properties, testing conditions, and compressive strength information are given in Table 4.

TABLE 3

Foamed Slurry Component Data
(Unless indicated otherwise,
all percentages given are BWOC)

| SLURRY #1 (Foamed to 11 PPG) | SLURRY #2 (Foamed to 11 PPG) |
|---|---|
| Holnam Type 1 Cement | Holnam Type 1 Cement |
| 5% "A-10" gypsum | 5% "METAMAX" Aluminum Silicate |
| 0.8% "CD-32" ethoxylated naphthalene sulfonate dispersant | 0.6% "CD-33" acetone formaldehyde condensate |
| 0.4% "BA-10" polyvinyl alcohol | 0.4% "BA-10" polyvinyl alcohol |
| 0.75% of "FAW-20" ethoxylated alcohol by weight of slurry ("BWOS") sulfate foaming agent | 0.5% "A-7" Calcium chloride accelerator |
| | 0.2% "A-2" sodium metasilicate |
| | 0.75% "FAW-20" ethoxylated alcohol sulfate foaming agent BWOS |

TABLE 4

Foamed Slurry Properties and Test Results

| Slurry Properties | Slurry #1 | Slurry #2 |
|---|---|---|
| Unfoamed Density, ppg | 15.2 | 15.2 |
| Foamed Density, ppg | 11 | 11 |
| Yield, cu.ft./sk. | 1.34 | 1.34 |
| Mixing water, gal/sk. | 6.08 | 6.06 |
| Water type: | SEA | SEA |
| Thickening Time @& 50° F. (hrs.) | 4 hrs, 13 min. | 4 hrs, 28 min. |
| Compressive Strength at 72 hrs., psi (measured @ 3000 psi curing pressure) | 148 | 282 |
| *Transition Time ("MACS" Results @ 66° F.) | 38 min. | 39 min. |

*Transition time of cement from 100#/100 ft² gel strength to 500#/100 ft² gel strength as determined by a "MACS" analyzer, available from Halliburton.

The results of Example 2 show that foamed aluminum silicate-containing cement Slurry #2 gives a 90% increase in early compressive strength development over conventional foamed cement Slurry #1 while, at the same time, offering a thickening time that is slightly greater than the thickening time of Slurry #1.

Examples 3

Aluminum Silicate-Containing Cements For Gas Intrusion Control

Gas flow model curves and thickening time test data were determined for embodiments of the disclosed method using cement slurries prepared for gas intrusion control.

Figure 4:
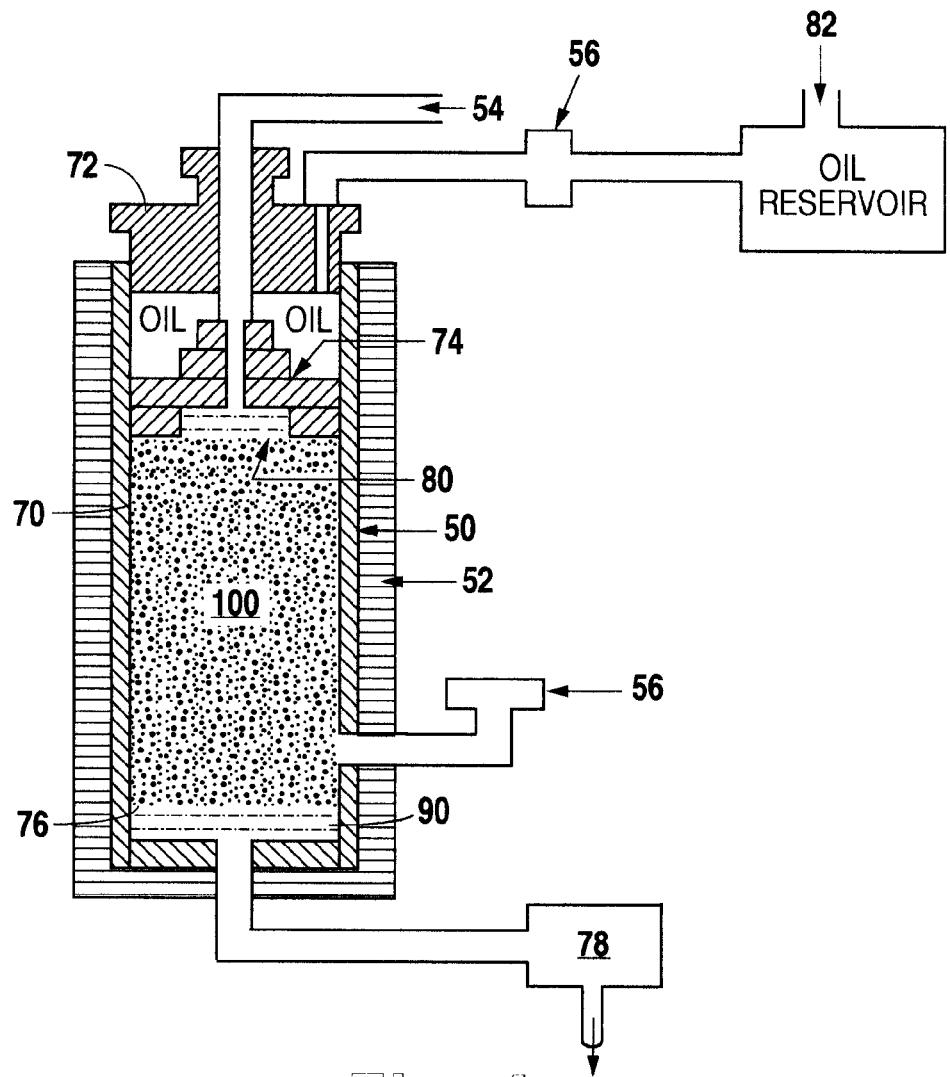
FIG. 4 is a simplified schematic of a gas flow test apparatus used in conducting Examples 3–8, and Comparative Examples A and B.

For Examples 3–8, a gas flow model was constructed to simulate a typical well configuration in which a cement slurry is exposed to its own hydrostatic pressure, a pressurized gas formation, and a lower pressure permeable zone, such as the situation illustrated in FIG. 3. A simplified schematic of the gas flow model is shown in FIG. 4. The gas flow model consisted of test cell 50, heating jacket 52, pressurized nitrogen gas source 54, pressure transducers 56, and (not shown) load cells, a linear variable differential transducer ("LVDT"), a data acquisition unit ("DAU"), and a computer. The test cell 50 consisted of test cylinder 70, top head assembly 72, floating piston 74, bottom assembly 76 and back pressure regulator 78.

For each example, the floating piston 74 was fitted with a 325 mesh stainless steel screen or core 80 (depending on the requirements of the run) and loaded into the test cylinder. Nitrogen gas pressure 54 was then applied to the screen or core 80 to simulate a gas bearing zone. The top head assembly 72 was then fitted into the top of the test cylinder 70 and hydraulic oil pressure 82 applied to the top of the piston to represent slurry hydrostatic pressure.

Next, each slurry design was mixed according to API Spec 10 and conditioned in an atmospheric or pressurized consistometer. After conditioning, each slurry 100 was transferred into the gas flow model and a 325 mesh fluid loss screen 90 was loaded into the bottom assembly 76 of the test cylinder. A back pressure regulator 78 was connected to the bottom assembly 76 to represent a low pressure permeable formation. The test cell assembly was installed into the pre-heated jacket 52 and a hydrostatic pressure 82 of 1000 psi, gas pressure 54 of 500 psi, and back pressure 78 of 300 psi were applied during each run. Hydrostatic pressure, cement pore pressure, piston movement, temperature, filtrate volume, water volume displaced by filtrate and/or gas volume were automatically monitored using the computer. Test data, including cement pore pressure, filtrate volume, water displaced by filtrate and/or gas volume are reflected in the attached gas flow model graphs (FIGS. 5–12).

Figure 12:
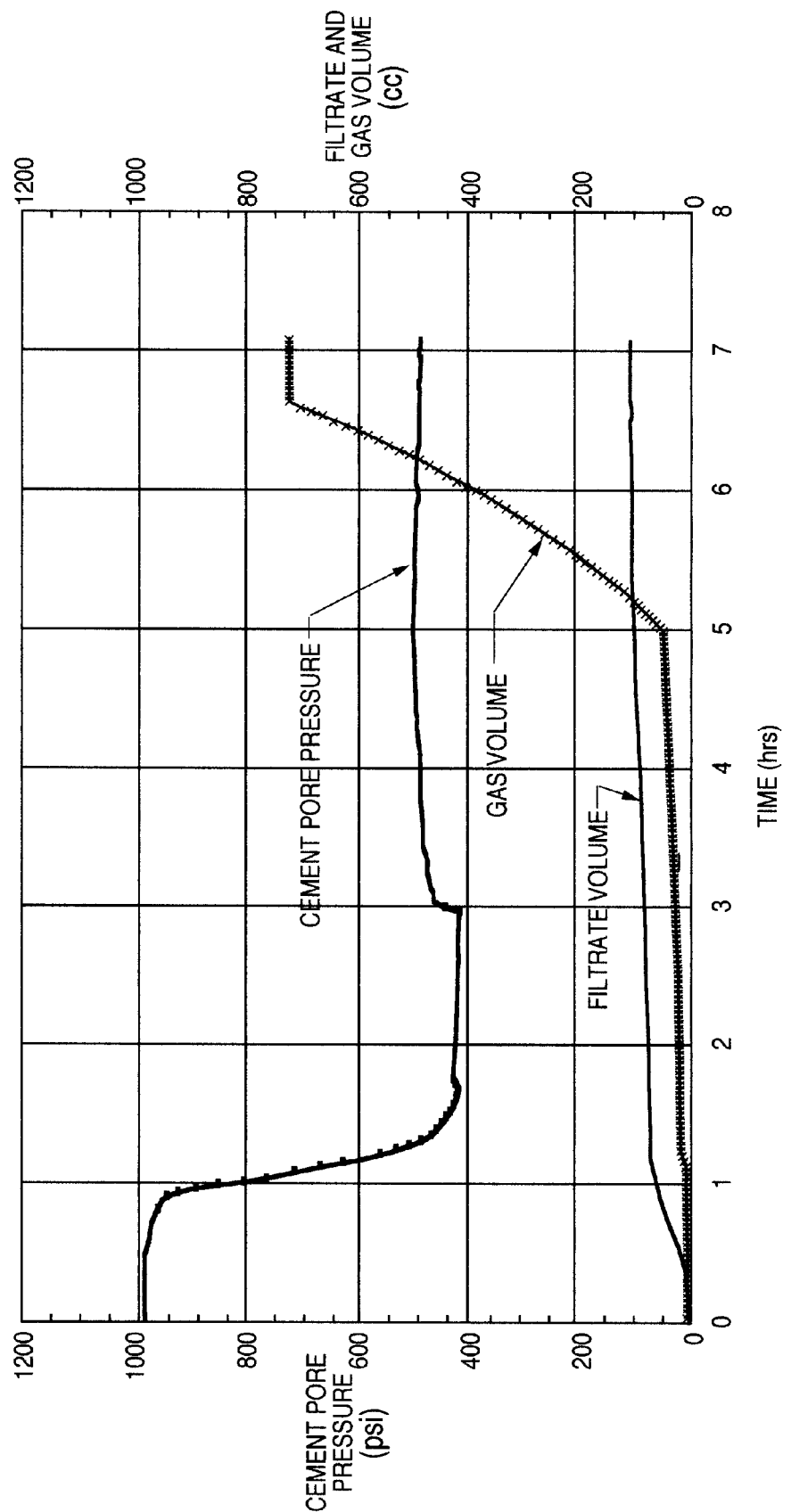
FIG. 12 shows cement pore pressure, gas volume, and filtrate volume as a function of time for the conventional cement slurry of Comparative Example B.

Using the gas model, cement pore pressure of each slurry sample begins decreasing over time with curing. However, when gas intrusion occurs into the curing cement, the cement pore pressure typically stops dropping and instead may increase (sometimes as a spike upward in the pore pressure) as may be seen in the data recorded in Comparative Example B (FIG. 12), reflecting the pressure of the invading fluid. When water displaced by filtrate is presented (FIGS. 7–10), gas intrusion will be evidenced by an increase in value of the water displaced by filtrate curve relative to the filtrate volume curve, indicating water displacement by gas. When the valve of water displacement by filtrate remains below the filtrate volume, no gas intrusion is indicated. Whether an increase is seen in pore pressure or not, gas intrusion into the slurry will typically be reflected by an increase in gas volume when this curve is presented, as may be seen in the data recorded in Comparative Examples A and B (FIGS. 11 and 12).

Example

In this example, an aluminum silicate-containing cement slurry was prepared using Inland Class G Cement formulated with 10% "METAMAX" aluminum silicate BWOC, 1.0% "FL-20" HEC-based fluid loss additive BWOC, 0.3% "CD-31" napthalene sulfonate dispersant BWOC, and 0.2% "R-3" sodium lignosulfonate cement retarder BWOC. The slurry was mixed to have density of 15.8 ppg and a yield of 1.25 ft³/sack, using 5.30 gallon/sack of fresh water.

Figure 5:
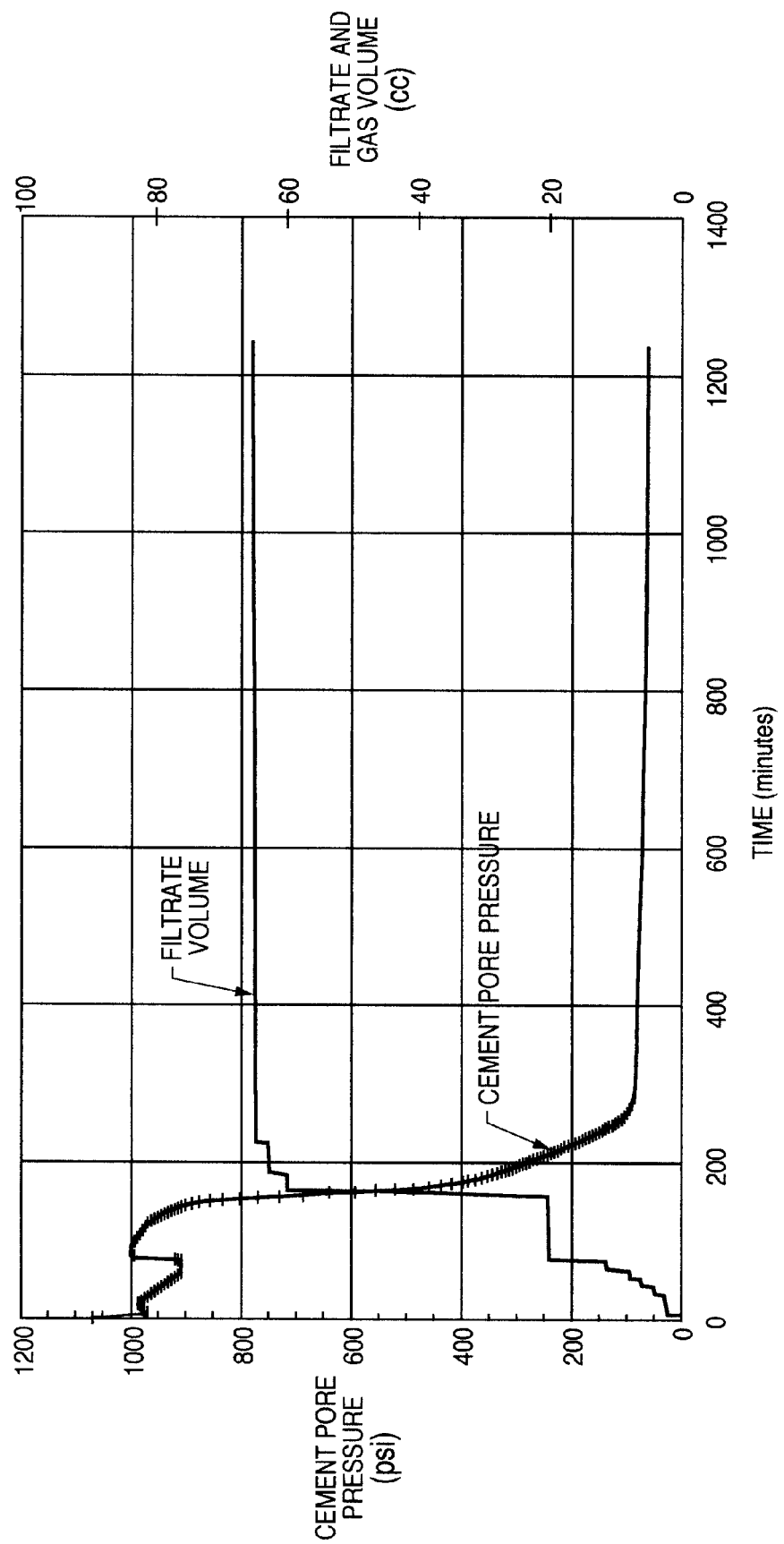
FIG. 5 shows cement pore pressure, and filtrate volume as a function of time for the aluminum silicate-containing cement slurry of Example 3 according to one embodiment of the disclosed method.

Results of the gas flow model testing on this slurry performed at 167° F. are presented in FIG. 5. As may be seen in FIG. 5, the cement pore pressure fell to less than 100 psi. Thickening time for this slurry was 4:26 hours at 167° F. As exhibited by the decline in pore pressure, the results of this example indicate that substantially no gas intrusion into the sample occurred.

Example 4

In this example, an aluminum silicate-containing cement slurry was prepared using UBE Class G Cement formulated with 10% "METAMAX" aluminum silicate BWOC, 1.0% "FL-20" HEC-based fluid loss additive BWOC, 0.3% "CD-31" napthalene sulfonate dispersant BWOC, and 0.35% "R-1" lignosulfonate cement retarder BWOC. The slurry was mixed to have density of 15.8 ppg and a yield of 1.25 ft$^3$/sack, using 5.30 gallon/sack of fresh water.

Figure 6:
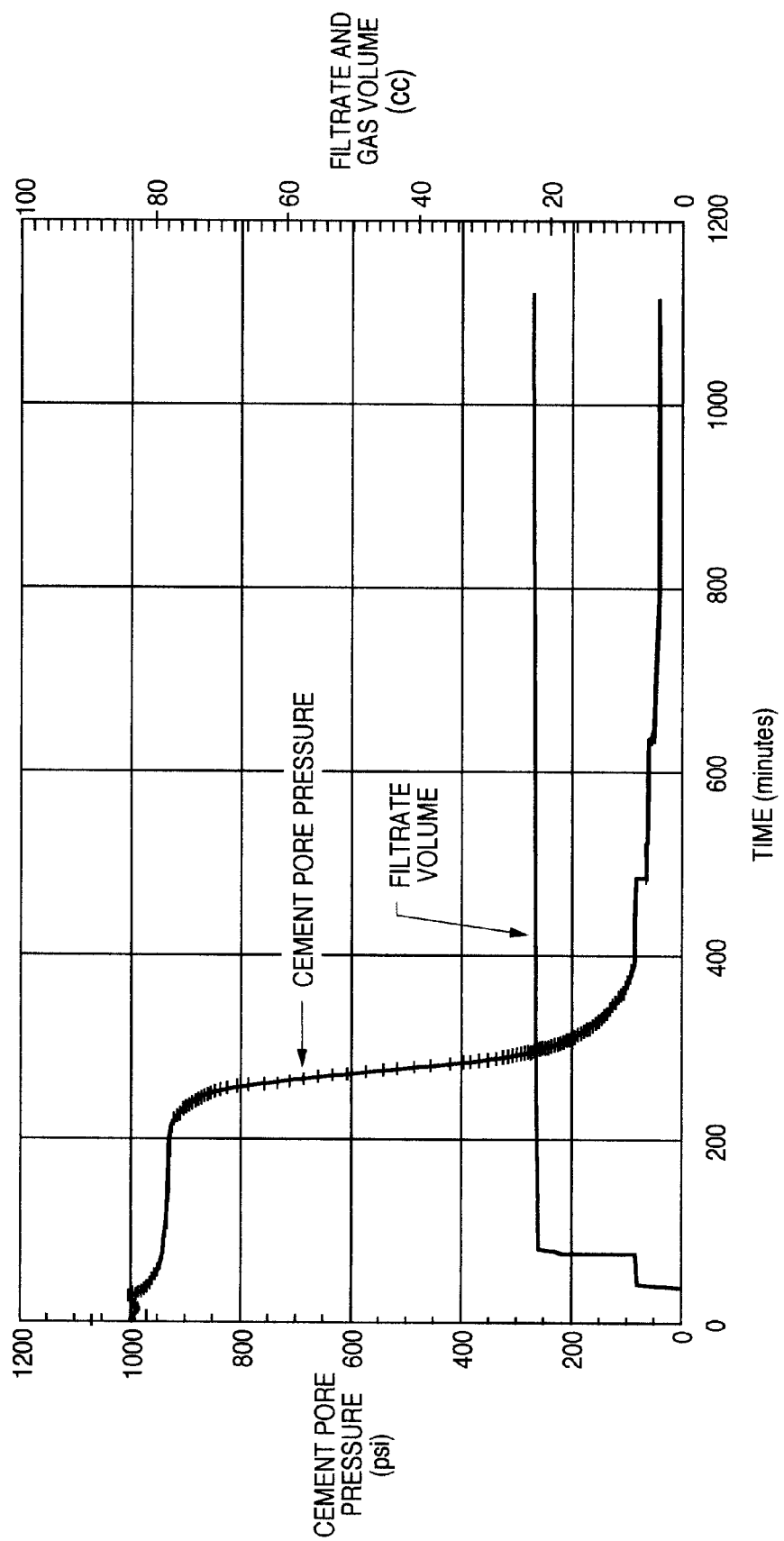
FIG. 6 shows cement pore pressure, and filtrate volume as a function of time for the aluminum silicate-containing cement slurry of Example 4 according to one embodiment of the disclosed method.

Results of the gas flow model testing on this slurry performed at 167° F. are presented in FIG. 6. Thickening time for this slurry was 3:26 hours at 167° F. As exhibited by the decline in pore pressure, the results of this example indicate that substantially no gas intrusion into the sample occurred.

Example 5

In this example, an aluminum silicate-containing cement slurry was prepared using Class us H Cement formulated with 8% "METAMAX" aluminum silicate BWOC, 35% "S-8C" coarse silica sand BWOC (available from BJ Services), 50% hematite BWOC, 1.75% "FL-20" HEC-based fluid loss additive BWOC, 0.2% "R-3" sodium lignosulfonate cement retarder BWOC, and 0.2% "CD-31" napthalene sulfonate dispersant BWOC. The slurry was mixed to have a density of 18.5 ppg and a yield of 1.67 ft$^3$/sack, using 5.88 gallon/sack of fresh water.

Figure 7:
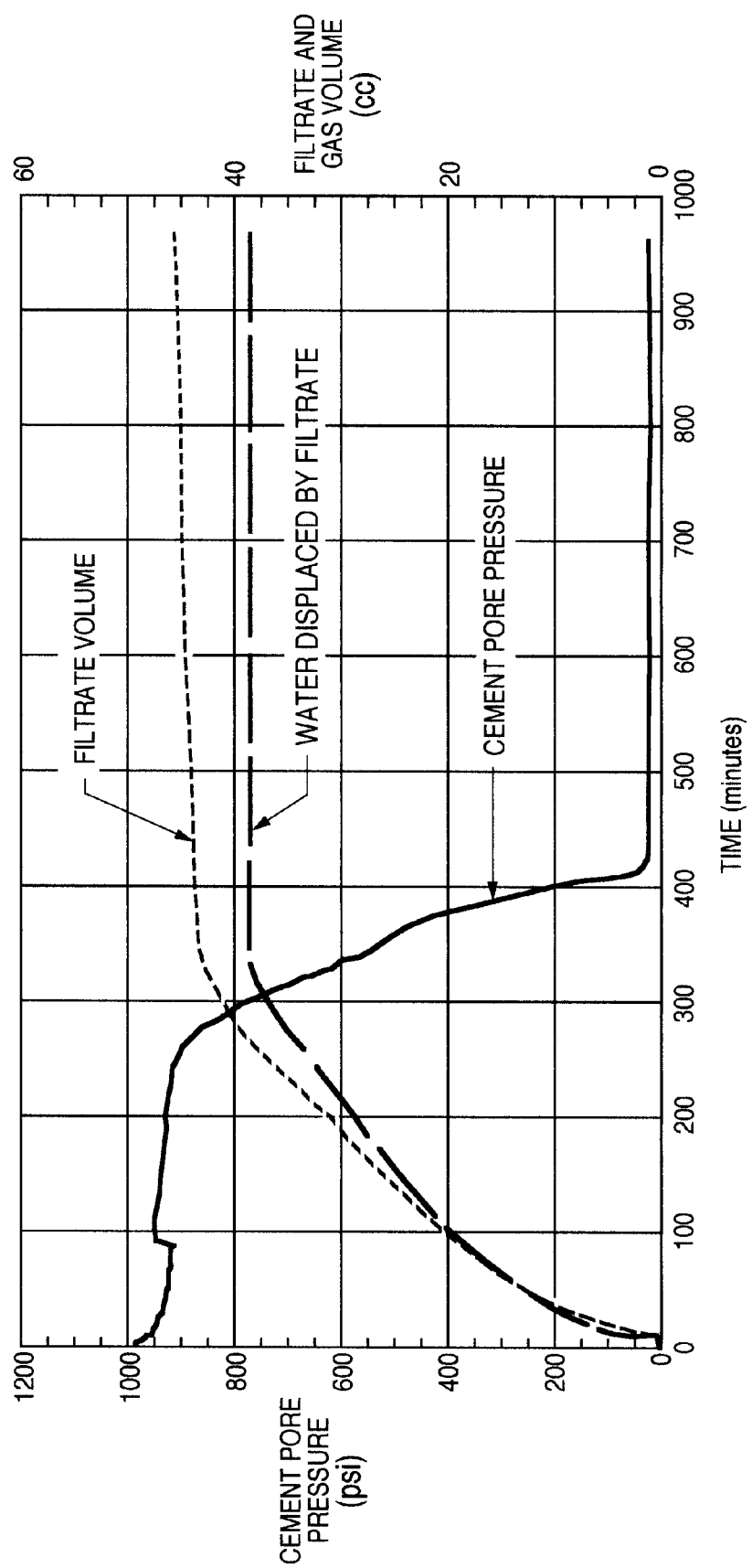
FIG. 7 shows cement pore pressure, water displaced by filtrate, and filtrate volume as a function of time for the aluminum silicate-containing cement slurry of Example 5 according to one embodiment of the disclosed method.

Results of the gas flow model testing on this slurry performed at 225° F. are presented in FIG. 7. Thickening time for this slurry was 5:03 hours at 225° F. As exhibited by the decline in pore pressure and the fact that the water displaced by filtrate remains less than the filtrate volume, the results of this example indicate that substantially no gas intrusion into the sample occurred.

Example 6

In this example, an aluminum silicate-containing cement slurry was prepared using Class H Cement formulated with 12% "METAMAX" aluminum silicate BWOC, 35% "S-8" silica flour BWOC, 0.4% "CD-31" napthalene sulfonate dispersant BWOC, 50 gallons per hundred sacks ("GHS") of "FL-32L" AMPS fluid loss additive, and 5.5 GHS of "R-15L" lignosulfonate liquid cement retarder (available from BJ Services). The slurry was mixed to have a density of 16.5 ppg and a yield of 1.50 ft$^3$/sack, using 5.56 gallon/sack of fresh water.

Figure 8:
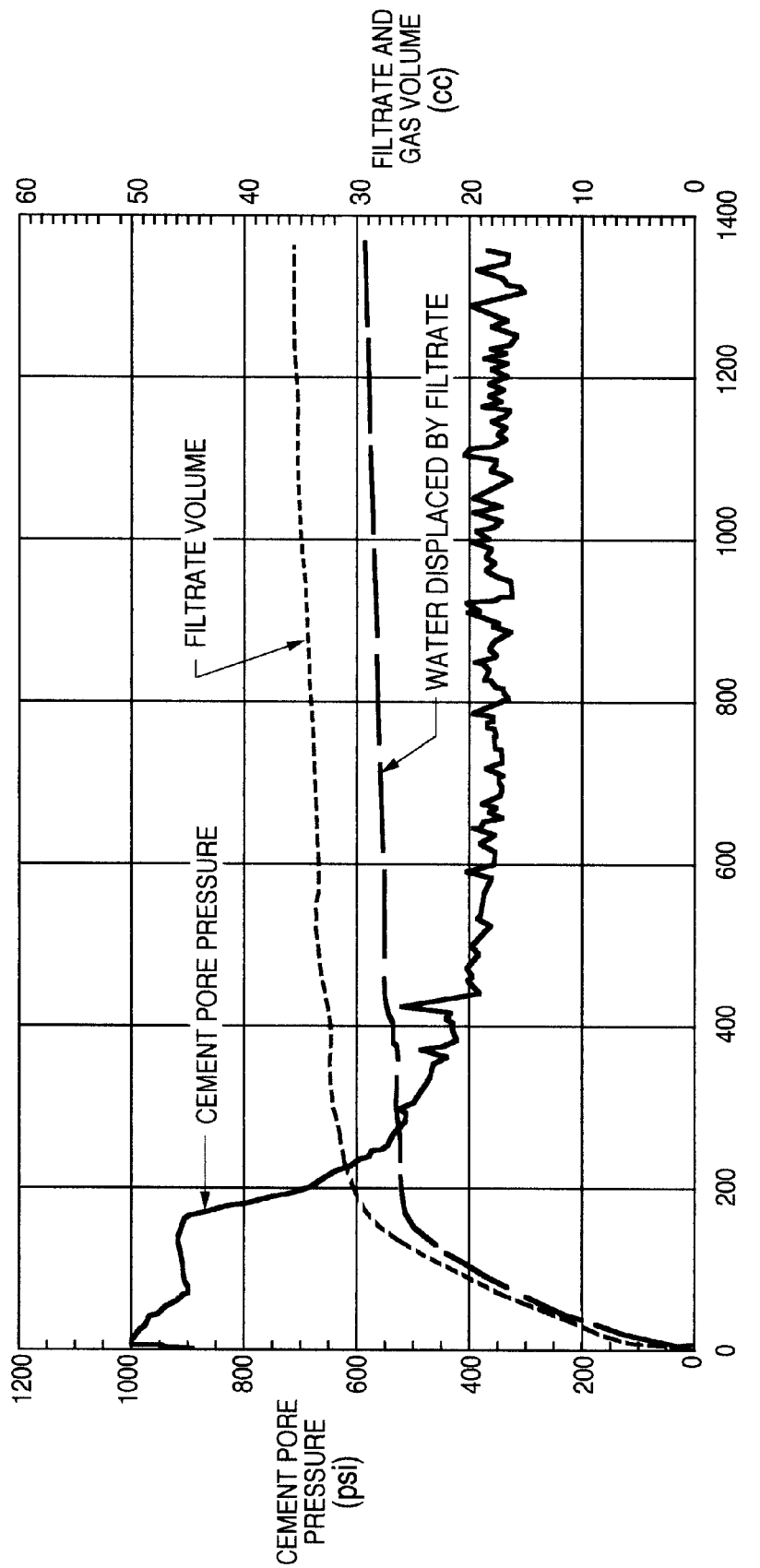
FIG. 8 shows cement pore pressure, water displaced by filtrate, and filtrate volume as a function of time for the aluminum silicate-containing cement slurry of Example 6 according to one embodiment of the disclosed method.

Results of the gas flow model testing on this slurry performed at 265° F. are presented in FIG. 8. Thickening time for this slurry was 3:36 hours at 265° F. As exhibited by the decline in pore pressure and the fact that the water displaced by filtrate remains less than the filtrate volume, the results of this example indicate that substantially no gas intrusion into the sample occurred.

Example 7

In this example, an aluminum silicate-containing cement slurry was prepared using Class H Cement formulated with 8% "METAMAX" aluminum silicate BWOC, and 1.0% "FL-19" HEC-based fluid loss additive BWOC (available from BJ Services). The slurry was mixed to have a density of 16.2 ppg and a yield of 1.17 ft$^3$/sack, using 4.77 gallon/sack of fresh water.

Figure 9:
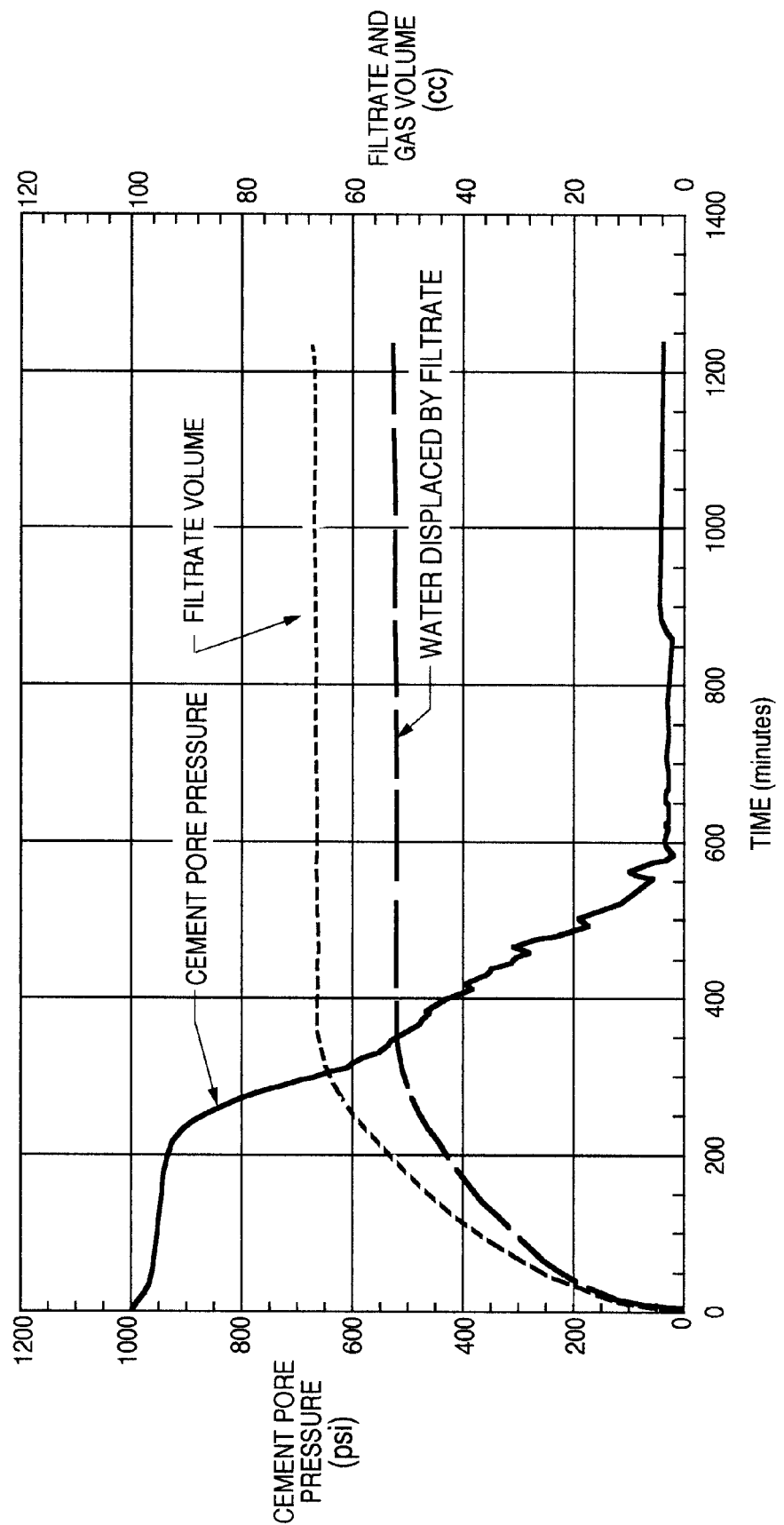
FIG. 9 shows cement pore pressure, water volume displaced by filtrate and filtrate volume as a function of time for the aluminum silicate-containing cement slurry of Example 7 according to one embodiment of the disclosed method.

Results of the gas flow model testing on this slurry performed at 120° F. are presented in FIG. 9. Thickening time for this slurry was 4:51 hours at 120° F. As exhibited by the decline in pore pressure and the fact that the water displaced by filtrate remains less than the filtrate volume, the results of this example indicate that substantially no gas intrusion into the sample occurred.

Example 8

In this example, an aluminum silicate-containing cement slurry was prepared using La Farge Class G Cement formulated with 10% "METAMAX" aluminum silicate BWOC, 1.0% BWOC "FL-62" polyvinyl alcohol-based fluid loss additive BWOC (available from BJ Services), and 0.2% "A-2" sodium metasilicate BWOC. The slurry was mixed to have a density of 15.8 ppg and a yield of 1.25 ft$^3$/sack, using 5.30 gallon/sack of fresh water (or 47.03% BWOC).

Results of the gas flow model testing on this slurry performed at 80° F. are presented in FIG. 10. The results of this example indicate that substantially no gas intrusion into the sample occurred. As exhibited by the decline in pore pressure and the fact that the water displaced by filtrate remains less than the filtrate volume, the results of this example indicate that substantially no gas intrusion into the sample occurred.

Comparative Examples A and B

Gas Intrusion in Conventional Cements

The gas flow model of FIG. 3 was used to evaluate gas intrusion characteristics of two conventional cement slurries in comparative examples A and B.

Comparative Example A

In this example, a conventional cement slurry was prepared using La Farge Class G Cement formulated with 1.2% "FL-62" polyvinyl alcohol-based fluid loss additive BWOC, 0.3% As "CD-32" ethoxylated naphthalene sulfonate dispersant BWOC, and 5.0% sodium chloride. The slurry was mixed to have a density of 15.9 ppg and a yield of 1.17 ft$^3$/sack, using 4.96 gallon/sack of fresh water.

Results of the gas flow model testing on this slurry performed at 80° F. are presented in FIG. 11. As may be seen in FIG. 11, the cement pore pressure fell to below about 400 psi. However, gas volume rose to above about 500 cc. The results of this example indicate that gas intrusion into the conventional cement sample occurred.

Comparative Example B

In this example, a conventional cement slurry was prepared using La Farge Class G Cement formulated with 0.7% "FL-19" HEC-based fluid loss additive BWOC, 7.0 GHS "A-3L" liquid sodium silicate, and 2.0 GHS "FP-6L" defoamer. The slurry was mixed to have a density of 15.9 ppg and a yield of 1.14 ft$^3$/sack, using 4.96 gallon/sack of fresh water.

Results of the gas flow model testing on this slurry performed at 80° F. are presented in FIG. 12. As may be seen in FIG. 12, the cement pore pressure fell to below about 450 psi, but spiked upward to close to 500 psi at 3 hours. In addition, gas volume rose to above about 700 cc. The results of this example indicate that gas intrusion into the conventional cement sample occurred.

Example 9

In this example, pozzolan (fly ash)-containing and "METAMAX" aluminum silicate-containing cements were compared. Bentonite was added to pozzolan (fly ash-containing) slurries where necessary to obtain sufficient viscosity. Components, amounts, and mixing characteristics of each slurry mix are listed in Table 5. Curing characteristics of each mix are listed in Table 6. The slurries were evaluated at temperatures ranging from 80° F. to 125° F. Mix No. 3 was prehydrated and shows similar thickening times as Mix No. 2.

As may be seen in Table 6 for any given mix ratio and/or density, the aluminum silicate-containing cement slurry gave increased compressive strength over similar low density slurries containing fly ash at 24 hours, 72 hours, and 21 days. Furthermore, the aluminum-silicate containing cement compositions had reduced permeability when compared to comparable cement compositions containing no aluminum-silicate. In this regard, permeability of set cement to water flow was determined using API Recommended Practice 10B, 22$^{nd}$ Edition, December 1997 (section 11.5).

Comparing Mix No. 1 and Mix No. 2, for example, shows that increased compressive strength was obtained with the aluminum silicate-containing slurry Mix No. 2 over the pozzolan-containing Mix No. 1. Furthermore, Mix No. 2 had very similar slurry rheologies as Mix No. 2, but with much less free water and no bentonite required.

TABLE 5

Mixing Characteristics of Pozzolan and Aluminum Silicate-Containing Cement Slurries (Example 9)

| Mix # | Type Mix | Mix Ratio | Class Cement | Density ppg. | Yield cult/sk | F. Water gal/sk | Pozzolan (Fly Ash) Class C | Cement | Ben-tonite | "METAMAX" Aluminum Silicate | "A-5" (NaCl) (%) | (BWOW) Pounds | "R-3" (%) (BWOB) | "A-2" (%) (BWOC) |
|---|---|---|---|---|---|---|---|---|---|---|---|---|---|---|
| 1 | P | 35:65:6 | A | 12:4 | 2.16 | 12.40 | 25.9 | 61.1 | 5.22 | — | 5.0 | 5.17 | — | — |
| 2 | AS | | A | 12.4 | 2.00 | 11.24 | — | 61.1 | — | 25.9 | 5.0 | 4.68 | — | — |
| 3 | AS | | A | 12.4 | 2.00 | 11.24 | — | 61.1 | — | P.H. 25.9 | 5.0 | 4.68 | — | — |
| 4 | P | 15:85:8 | A | 12.4 | 2.28 | 12.91 | 11.1 | 79.9 | 7.28 | | 5.0 | 5.38 | — | — |
| 5 | AS | | A | 12.4 | 2.29 | 12.95 | — | 79.9 | 7.28 | 11.1 | 5.0 | 5.42 | — | — |
| 6 | P | 15:85:8 | A | 12.2 | 2.41 | 13.84 | 11.1 | 79.9 | 7.28 | | 5.0 | 5.77 | — | — |
| 7 | AS | | A | 12.2 | 2.37 | 13.67 | — | 79.9 | 5.46 | 11.1 | 5.0 | 5.18 | — | — |
| 8 | P | 40:60:8 | A | 12.2 | 2.21 | 12.42 | 29.6 | 56.4 | 6.88 | | 5.0 | 5.70 | — | — |
| 9 | AS | | A | 12.2 | 1.95 | 10.98 | — | 56.4 | — | 29.6 | 5.0 | 4.95 | — | — |
| 9 | AS | | A | 12.2 | 100 | 2:14 | | | | | | | | |
| 10 | AS | | A | 12.2 | 1.95 | 10.98 | — | 56.4 | — | 29.6 | — | — | 0.3% 0.26# | — |
| 11 | N | 1:0:0 | A | 12.2 | 2.25 | 13.16 | — | — | — | — | — | — | — | 2.0% 1.88# |
| 12 | P | 35:65:6 | H | 12.7 | 1.85 | 10.00 | 25.9 | 61.1 | 5.22 | — | — | — | — | — |
| 12 | P | 35:65:6 | H | 12.7 | 120 | | 165 | 355 | 781 | | | | | |
| 13 | AS | | H | 12.7 | 1.76 | 9.56 | — | 61.1 | — | 25.9 | — | — | — | — |
| 14 | P | 35:65:6 | G | 12.7 | 1.85 | 10.00 | 25.9 | 61.1 | 5.22 | | — | — | — | — |
| 15 | AS | | G | 12.7 | 1.76 | 9.56 | — | 61.1 | — | 25.9 | — | — | — | — |

BWOW-By weight of the mix water
BWOC-By weight of cement
BWOB-By weight of blend (cement/"METAMAX")
P.H.-Means additive was pre-hydrated in the mix water
P-Slurry design with Pozzolan (Fly Ash) mix
AS-Slurry design with "METAMAX" aluminum silicate
Mix Ratio-Given for Pozzolan slurries as -- pozzolan:hydraulic cement:bentonite.
N-Neat cement
UCA-Ultrasonic Cement Analyzer

TABLE 6

Properties of Pozzolan and Aluminum Silicate Containing Cements (Example 9)

| Mix # | Type Mix | Mix Ratio | Class Cmt | Den. ppg. | Temp. deg F. | T. time hours | Comp. Strength (psi) 24 hrs | 72 hrs | 21 days | Free Water (% by vol. of slurry) | Rheology 300 | 200 | 100 | 6 | 3 | 600 | Perm. to water (md); API RP 10B, Sec. 11.5 |
|---|---|---|---|---|---|---|---|---|---|---|---|---|---|---|---|---|---|
| 1 | P | 35:65:6 | A | 12.4 | 80 | 6:33 | 292 | 694 | 1165 | 1.44 | 53 | 49 | 45 | 25 | 18 | 63 | 0.0013 |
| 2 | AS | | A | 12.4 | 80 | 4:07 | 749 | 2056 | 2475 | 0.08 | 50 | 45 | 38 | 23 | 19 | 65 | 0.0007 |
| 3 | AS | | A | 12.4 | 80 | 4:08 | | | | | | | | | | | |

TABLE 6-continued

Properties of Pozzolan and Aluminum Silicate Containing Cements (Example 9)

| Mix # | Type Mix | Mix Ratio | Class Cmt | Den. ppg. | Temp. deg F. | T. time hours | Comp. Strength (psi) 24 hrs | 72 hrs | 21 days | Free Water (% by vol. of slurry) | Rheology 300 | 200 | 100 | 6 | 3 | 600 | Perm. to water (md); API RP 10B, Sec. 11.5 |
|---|---|---|---|---|---|---|---|---|---|---|---|---|---|---|---|---|---|
| 4 | P | 15:85:6 | A | 12.4 | 80 | 5:08 | 445 | 741 | 1180 | 0.92 | 61 | 57 | 53 | 30 | 22 | 66 | 0.0014 |
| 5 | AS | | A | 12.4 | 80 | 4:12 | 514 | 1369 | 1670 | 0.32 | 78 | 73 | 67 | 38 | 28 | 90 | 0.0009 |
| 6 | P | 15:85:6 | A | 12.2 | 80 | 5:32 | 182 | 535 | 1068 | 1.20 | 38 | 36 | 32 | 18 | 12 | 48 | 0.0037 |
| 7 | AS | | A | 12.2 | 80 | 4:21 | 219 | 988 | 1531 | 0.56 | 38 | 34 | 30 | 19 | 14 | 48 | 0.0028 |
| 8 | P | 40:60:8 | A | 12.2 | 80 | 4:52 | 237 | 598 | 1050 | 1.00 | 48 | 44 | 39 | 17 | 12 | 59 | 0.0030 |
| 8 | P | 40:60:8 | A | 12.2 | 100 | 3:09 | | | | | | | | | | | |
| 8 | P | 40:60:8 | A | 12.2 | 125 | 2:37 | | | | 0.32 | 53 | 51 | 47 | 19 | 14 | 59 | |
| 9 | AS | | A | 12.2 | 80 | 3:38 | 691 | 1556 | 2875 | 0.00 | 55 | 53 | 49 | 20 | 16 | 61 | 0.0017 |
| 9 | AS | | A | 12.2 | 100 | 2:14 | | | | | | | | | | | |
| 10 | AS | | A | 12.2 | 125 | 2:01 | | | | 0.16 | 44 | 40 | 33 | 18 | 12 | 57 | |
| 11 | P | 1:0:0 | A | 12.2 | 80 | 4:21 | 498 | 769 | 1169 | TRACE | 40 | 37 | 32 | 21 | 15 | 48 | |
| 12 | P | 35:65:6 | H | 12.7 | 103 | 5:21 | | | | 0.96 | 131 | 124 | 115 | 43 | 34 | 145 | |
| 12 | P | 35:65:6 | H | 12.7 | 120 | | 165 | 355 | 781 | | | | | | | | |
| 13 | AS | | H | 12.7 | 103 | 3:12 | | | | 0.00 | 93 | 82 | 70 | 30 | 22 | 103 | |
| 13 | AS | | H | 12.7 | 120 | | 683 | 1788 | 2544 | | | | | | | | |
| 14 | P | 35:65:6 | G | 12.7 | 103 | 3:29 | | | | 0.32 | 161 | 153 | 136 | 44 | 35 | 175 | |
| 14 | P | 35:65:6 | G | 12.7 | 120 | | 163 | 416 | 863 | | | | | | | | |
| 15 | AS | | G | 12.7 | 103 | 2:29 | | | | 0.00 | 142 | 126 | 108 | 38 | 29 | 153 | |
| 15 | AS | | G | 12.7 | 120 | | 619 | 2038 | 2813 | | | | | | | | |

Examples 10 and 11

Heat of Hydration and Compressive Strength of Aluminum Silicate/Aluminum Sulfate-Containing Cements In Examples 10 and 11, heat of hydration and compressive strength were determined for embodiments of the disclosed cement compositions that contain aluminum silicate, and for embodiments containing aluminum sulfate and aluminum silicate, as well as for conventional gypsum-containing cement compositions. UCA compressive strength data was obtained using API RP 10B, section 8.1.

In Example 10, heats of hydration for a conventional gypsum-containing cement and an aluminum silicate-containing cement composition were respectively determined using a cement biocalorimeter (a "Seebeck Envelope Calorimeter" ("SEC") manufactured by Thermonetics Corporation, San Diego, Ca.).

In Example 11, compressive strength values for a conventional gypsum-containing cement and an aluminum silicate/aluminum sulfate-containing cement composition were respectively determined after freeze-thaw testing using the procedure of API RP 10B, section 14.6.

Example 10

In the following example, heat of hydration for one embodiment of an aluminum silicate-containing cement composition was determined and compared to a conventional gypsum-containing cement system (commercially available as "Cold Set II" from BJ Services). Characteristics of the conventional gypsum cement composition (Slurry #1) and the aluminum silicate cement composition (Slurry #2) are presented in Tables 7 and 8. Components of the slurry systems are listed in Table 7. Slurry properties, testing conditions, etc. are presented in Table 8. As may be seen from Table 8, Slurry #2 exhibited a heat of hydration measured at 45° F. (immediately after mixing) of between about 2 and about 3 Calories/Second-kg (by weight of slurry), and a heat of hydration measured at 45° F. (at start of change from liquid to solid) of between 0 and about 1 Calories/Second-kg (by weight of slurry).

TABLE 7

Slurry Component Data
(All percentages of cement composition components given are BWOC)

| SLURRY #1 ("Cold Set II") | SLURRY #2 |
|---|---|
| 26.04 lbs Class G cement | Type I Cement |
| 44.44 lbs gypsum (A-10) | 30% "MPA-1" ("METAMAX") metakaolin |
| 3.88 lbs gilsonite | 15% "S-8" silica flour |
| 0.08 lbs. R-7 Cold Set Retarder | 15% BWOW NaCl |
| 0.31 lbs. CD-31 Napthalene Sulfonic Acid | 0.3% "CD-32" ethoxylated napthalene sulfonate dispersant |

TABLE 8

Slurry Properties and Test Results

| Slurry Properties | Slurry #1 | Slurry #2 |
|---|---|---|
| Density, ppg | 14.9 | 14.9 |
| Yield, cu.ft./sk. | 0.96 | 1.97 |
| Mixing water, gal/sk. | 3.89 | 8.71 |
| Water type: | Fresh | Fresh |
| Heat of Hydration (Calories/Second-kg by weight of slurry) | | |
| @75° F. (immediately after mixing) | 62.68 | 15.19 |
| @45° F. (immediately after mixing) | 6.094 | 2.285 |
| @45° F. (at start of change from liquid to solid) | 1.546 (after hours, 27 minutes) | 0.96 (after 4 hours, 8 minutes) |

Example 11

In the following example, compressive strength of one embodiment of an aluminum silicate/aluminum sulfate-containing cement composition having $CaCl_2$ was determined and compared to a conventional gypsum-containing cement system (commercially available as "COLD SET III" from BJ Services). Characteristics of the conventional gypsum cement composition (Slurry #1) and the aluminum silicate/aluminum sulfate cement composition (Slurry #2) are presented in Tables 9 and 10. Components of the slurry systems are listed in Table 9. Slurry properties, testing conditions, etc. are presented in Table 10.

TABLE 9

Slurry Component Data
(All percentages of cement composition components given are BWOC)

| SLURRY #1 ("COLD SET III") | SLURRY #2 |
|---|---|
| 26.64 lbs Class G cement | Class G Cement |
| 43.40 lbs gypsum | 30% "MPA-1" metakaolin |
| 10.54 lbs $CaCl_2$ | 7% Aluminum sulfate |
| 2.5 lbs Gilsonite | 3% "A-7" $CaCl_2$ |
| 0.257 lbs "AG-21R" guar gum suspension agent | 3% "A-2" sodium metasilicate |
| 4 lbs. "A-2" sodium metasilicate | 15% "A-5" NaCl BWOW |
| 1.25 lbs lime | 0.3% "CD-32" ethoxylated napthalene sulfonate dispersant |
| 0.13 lbs "R-7" cold set retarder | |

TABLE 10

Slurry Properties and Test Results

| Slurry Properties | Slurry #1 | Slurry #2 |
|---|---|---|
| Density, ppg | 12.2 | 12.2 |
| Yield, cu.ft./sk. | 1.9 | 3.49 |
| Mixing water, gal/sk. | 10.53 | 19.5 |
| Water type: | fresh | fresh |
| UCA Compressive Strength @ 50° F. (psi) | | |
| Time to 50 psi. | 5 hours, 13 minutes | 12 hours, 40 minutes |
| UCA Compressive Strength at 24 hrs., psi (measured @ 2000 psi curing pressure) | 90 | 96 |
| UCA Compressive Strength at 42 hrs., psi (measured @ 2000 psi curing pressure) | 129 | 175 |
| UCA Compressive Strength at 96 hrs., psi (measured @ 2000 psi curing pressure) | 197 | 360 |
| UCA Compressive Strength at 137 hrs., psi (measured @ 2000 psi curing pressure) | — | 669 |
| UCA Compressive Strength after First Freeze-Thaw, psi (measured @ atmospheric pressure) | — | 1190 |
| UCA Compressive Strength after Third Freeze-Thaw, psi (measured @ atmospheric pressure) | — | 1308 |
| Heat of Hydration (Calories/Second-kg by weight of slurry) | | |
| @45° F. (immediately after mixing) | 10.93 | 5.60 |
| @45° F. (at start of change from liquid to solid) | — | 5.50 (after 19 hours, 24 minutes) |

As may be seen from Table 10, Slurry #2 exhibited a heat of hydration measured at 45° F. (immediately after mixing) of between about 5 and about 6 Calories/Second-kg (by weight of slurry), and a heat of hydration measured at 45° F. (at start of change from liquid to solid) of between 5 and about 6 Calories/Second-kg (by weight of slurry).

As indicated by the test results of Example 10, aluminum silicate-containing cement compositions exhibit improved heat of hydration properties and compressive strength development compared to conventional systems. As shown by the results of Example 11, combination of aluminum silicate with aluminum sulfate results in a composition having improved compressive strength after 24 hours, or at times greater than 24 hours, while at the same time having a heat of hydration comparable to or less than a conventional cement composition, even when containing $CaCl_2$. The freeze-thaw cycle test results demonstrate the suitability of aluminum silicate/aluminum sulfate systems for use in permafrost environments, achieving a compressive strength of greater than about 1100 psi after a first freeze-thaw, and greater than 1300 psi after a third freeze-thaw.

Although particular exemplary embodiments of the disclosed compositions have been described and illustrated herein, it will be understood with benefit of this disclosure that benefits of the disclosed cement compositions and cementing methods may be realized in any type of wellbore cementing application, including in completion, remedial, workover, and/or abandonment cementing applications using cementing methods known in the art. Examples of specific applications include, but are not limited to, cementing casing and liner strings, inflatable packers, squeezing perforations and casing leaks, etc.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed compositions and methods may be utilized in various combinations and/or independently. Thus the invention is not limited to only those combinations shown herein, but rather may include other combinations.

What is claimed is:

1. A method of cementing within a wellbore, comprising:
   introducing a cement slurry comprising effective amounts of Portland cement, aluminum silicate and metal sulfate into a wellbore; and
   allowing said cement slurry to cure within said wellbore;
   wherein said metal sulfate comprises aluminum sulfate; and
   wherein said cement slurry is formulated from a cement composition comprising greater than or equal to about 50% Portland cement by weight of total dry blend prior to addition of water; and wherein said cement slurry contains effective amounts of aluminum silicate and aluminum sulfate such that said cement slurry exhibits a compressive strength of greater than about 90 psi as measured at 50° F. at 24 hours, in combination with a heat of hydration of equal to or less than about 6 Cal./Sec-kg (by weight of slurry) as measured at 45° F. immediately after mixing.

2. The method of claim 1, wherein said cement slurry has a slurry density of about 12.2 ppg or greater.

3. The method of claim 1, wherein said cement slurry exhibits a thickening time to 100 $B_c$ of from about 2.5 hours to about 5.5 hours as measured on a HTHP consistometer at the bottom hole circulating temperature of said wellbore.

4. The method of claim 1, wherein said cement slurry contains substantially no gypsum.

5. A method of cementing within a wellbore, comprising:
   introducing a cement slurry comprising effective amounts of Portland cement, aluminum silicate and metal sulfate into a wellbore; and allowing said cement slurry to cure within said wellbore;

wherein said metal sulfate comprises aluminum sulfate; and wherein at least a portion of said cement slurry is allowed to cure at a temperature of less than or equal to about 32° F. within said wellbore.

6. A method of cementing within a wellbore, comprising:

introducing a cement slurry comprising effective amounts of Portland cement, aluminum silicate and metal sulfate into a wellbore; and allowing said cement slurry to cure within said wellbore;

wherein said metal sulfate comprises aluminum sulfate; and wherein said cement slurry cures to have a compressive strength of greater than or equal to about 1100 psi after freeze-thaw testing at atmospheric pressure per API RP 10B, section 14.6 (December, 1997).

7. A method of cementing within a wellbore, comprising:

introducing a cement slurry comprising effective amounts of hydraulic cement, high reactivity metakaolin, and aluminum sulfate into a wellbore; and allowing said cement slurry to cure within said wellbore;

wherein said cement slurry is formulated from a cement composition comprising greater than or equal to about 50% Portland cement by weight of total dry blend prior to addition of water.

8. The method of claim 7, wherein said cement slurry comprises from about 1% to about 75% or high reactivity metakaolin BWOC; and from about 1% to about 10% of aluminum sulfate BWOC.

9. The method of claim 8, wherein at least a portion of said cement is allowed to cure at a temperature of from about 10° F. to about 32° F.

10. The method of claim 8, wherein said cement slurry contains effective amounts of aluminum sulfate and high reactivity metakaolin such that said cement slurry exhibits a compressive strength of greater than about 90 psi as measured at 50° F. at 24 hours, in combination with a beat of hydration of equal to or less than about 6 Cal./Sec-kg (by weight of slurry) as measured at 45° F. immediately after mixing.

11. The method of claim 10, wherein said cement slurry has a slurry density of from about 12.2 ppg to about 18 ppg.

12. The method of claim 11, wherein said cement slurry exhibits a thickening time to 100 $B_c$ of from about 2.5 hours to about 5.5 hours as measured on a HTHP consistometer at the bottom hole circulating temperature of said wellbore.

13. The method of claim 12, wherein said cement slurry further comprises from about 1% to about 20% of NaCl BWOC, and from about 1% to about 5% of $CaCl_2$ BWOC; wherein said cement slurry cures to have a compressive strength of greater than or equal to about 1100 psi after freeze-thaw testing at atmospheric pressure per API RP 10B, section 14.6 (December, 1997); and wherein at least a portion of said cement slurry is allowed to cure within said wellbore at a temperature of less than about 32° F.

14. The method of claim 11, wherein said cement slurry contains substantially no gypsum.

15. The method of claim 8, wherein said cement slurry substantially prevents intrusion of fluids into said wellbore prior to and after setting of said cement slurry.

16. The method of claim 8, wherein said cement slurry further comprises from about 1% to about 20% of NaCl BWOC; and from about 1% to about 5% of $CaCl_2$ BWOC.

17. The method of claim 8, wherein said cement slurry cures to have a compressive strength of greater than or equal to about 1100 psi after freeze-thaw testing at atmospheric pressure per API RP 10B, section 14.6 (December, 1997).

18. The method of claim 7, wherein said high reactivity metakaolin comprises:

calcined anhydrous kaolin $Al_2O_3.SiO_2$ composed of 97% $SiO_2+Al_2O_3+Fe_2O_3$ average particle size of about 1.5 $\mu M$, and a specific gravity of about 2.5; or calcined anhydrous kaolin $Al_2O_3.SiO_2$ composed of 98% $SiO_2+Al_2O_3+Fe2O3$ having an average particle size of about 0.5 $\mu M$, and a specific gravity of about 2.5; or a mixture thereof.

19. A method of cementing within a wellbore, comprising:

introducing a cement slurry comprising effective amounts of Portland cement, aluminum silicate and initial sulfate into a wellbore; and allowing said cement slurry to cure within said wellbore;

wherein said metal sulfate comprises aluminum sulfate;

wherein said aluminum silicate comprises high reactivity metakaolin; and wherein said high reactivity metakaolin comprises:

calcined anhydrous kaolin $Al_2O_3.SiO_2$ composed of 97% $SiO_2+Al_2O_3+Fe_2O_3$ having an average particle size of about 1.5 $\mu M$, and a specific gravity of about 2.5; or calcined anhydrous kaolin $Al_2O_3.SiO_2$ composed of 98% $SiO_2+Al_2O_3+Fe_2O_3$ having an average particle size of about 0.5 $\mu M$, and a specific gravity of about 2.5; or a mixture thereof.

20. A method of cementing within a wellbore, comprising:

introducing a cement slurry comprising effective amounts of hydraulic cement, aluminum silicate and metal sulfate into a wellbore; and allowing said cement slurry to cure within said wellbore;

wherein said metal sulfate comprises aluminum sulfate; and wherein at least a portion of said cement slurry is allowed to cure at a temperature of less than or equal to about 32° F. within said wellbore.

21. A method of cementing within a wellbore, comprising, introducing a cement slurry comprising effective amounts of hydraulic cement, aluminum silicate and metal sulfate into a wellbore; and allowing said cement slurry to cure within said wellbore;

wherein said metal sulfate comprises aluminum sulfate; and wherein said cement slurry cures to have a compressive strength of greater than or equal to about 1100 psi after freeze-thaw testing at atmospheric pressure per API RP 10B, section 14.6 (December, 1997).

22. A method of cementing within a wellbore, comprising:

introducing a cement slurry comprising effective amounts of hydraulic cement, aluminum silicate and metal sulfate into a wellbore; and allowing said cement slurry to cure within said wellbore;

wherein said metal sulfate comprises aluminum sulfate;

wherein said aluminum silicate comprises high reactivity metakaolin; and wherein said high reactivity metakaolin comprises:

calcined anhydrous kaolin $Al_2O_3.SiO_2$ composed of 97% $SiO_2+Al_2O_3+Fe_2O_3$ having an average particle size of about 1.5 $\mu M$, and a specific gravity of about 2.5; or calcined anhydrous kaolin $Al_2O_3 \cdot SiO_2$ composed of 98% $SiO_2+Al_2O_3+Fe_2O_3$ having an average particle size of about 0.5 $\mu M$, and a specific gravity of about 2.5; or a mixture thereof.

23. A method of cementing within a wellbore, comprising:

introducing a cement slurry comprising effective amounts of hydraulic cement, aluminum silicate and aluminum sulfate into a wellbore; and allowing said cement slurry to cure within said wellbore;

wherein said cement slurry contains effective amounts of aluminum silicate and aluminum sulfate such that said cement slurry exhibits a compressive strength of greater than about 90 psi as measured at 50° F. at 24 hours, in combination with a heat of hydration of equal to or less than about 6 Cal./Sec-kg (by weight of slurry) as measured at 45° F. immediately after mixing.

24. The method of claim 23, wherein said aluminum silicate comprises high reactivity metakaolin.

* * * * *

UNITED STATES PATENT AND TRADEMARK OFFICE
CERTIFICATE OF CORRECTION

PATENT NO. : 6,626,243 B1
DATED : September 30, 2003
INVENTOR(S) : Go Boncan

It is certified that error appears in the above-identified patent and that said Letters Patent is hereby corrected as shown below:

Column 37,
Line 39, delete "beat" and insert -- heat -- therefor.

Column 38,
Line 6, insert -- having an -- before "average" therefor.
Line 9, delete "O3" and insert -- $O_3$ -- therefor.

Signed and Sealed this

Thirteenth Day of January, 2004

JON W. DUDAS
*Acting Director of the United States Patent and Trademark Office*